US012488598B2

(12) United States Patent
Nakashima et al.

(10) Patent No.: US 12,488,598 B2
(45) Date of Patent: Dec. 2, 2025

(54) CONTROL DEVICE, CONTROL METHOD, AND CONTROL PROGRAM

(71) Applicants: HONDA MOTOR CO., LTD., Tokyo (JP); AISIN CORPORATION, Aichi (JP)

(72) Inventors: Hiroyuki Nakashima, Tokyo (JP); Tatsuro Fujiwara, Tokyo (JP); Kazutaka Hayakawa, Kariya (JP); Yoji Inui, Kariya (JP)

(73) Assignees: HONDA MOTOR CO., LTD., Tokyo (JP); AISIN CORPORATION, Kariya (JP)

( * ) Notice: Subject to any disclaimer, the term of this patent is extended or adjusted under 35 U.S.C. 154(b) by 65 days.

(21) Appl. No.: 18/490,859

(22) Filed: Oct. 20, 2023

(65) Prior Publication Data

US 2024/0135725 A1 Apr. 25, 2024
US 2024/0233402 A9 Jul. 11, 2024

(30) Foreign Application Priority Data

Oct. 24, 2022 (JP) ................................. 2022-169833

(51) Int. Cl.
*G08G 1/14* (2006.01)
*B60W 30/06* (2006.01)
(Continued)

(52) U.S. Cl.
CPC ........... *G06V 20/586* (2022.01); *B60W 30/06* (2013.01); *B60W 40/105* (2013.01);
(Continued)

(58) Field of Classification Search
CPC .. G06V 20/586; B60W 30/06; B60W 40/105; B60W 50/14; B60W 2050/146;
(Continued)

(56) References Cited

U.S. PATENT DOCUMENTS 10,242,575 B1 * 3/2019 Chan ...................... G08G 1/142
10,974,764 B2 * 4/2021 Inoue ..................... B60K 35/00
(Continued)

FOREIGN PATENT DOCUMENTS

DE 10 2013 015 348 A1 4/2014
JP 2020-117128 A 8/2020

OTHER PUBLICATIONS

Extended European Search Report dated Mar. 28, 2024, Application No. EP 23205259.7; 10 pages.

*Primary Examiner* — Anh V La
(74) *Attorney, Agent, or Firm* — Rankin, Hill & Clark LLP

(57) ABSTRACT

A control device for a moving body includes an outside recognition unit, a parking candidate position detection unit, and a reception unit. The parking candidate position detection unit is configured to be able to execute a first detection process of detecting an unregistered parking candidate position and a second detection process of detecting a registered parking candidate position, start the first detection process based on an operation by the user, stop the first detection process when detecting that a movement speed of the moving body during movement of the moving body becomes equal to or less than a predetermined speed, and start the second detection process based on stopping of the first detection process.

10 Claims, 13 Drawing Sheets

(51) Int. Cl.
*B60W 40/105* (2012.01)
*B60W 50/14* (2020.01)
*G06V 20/58* (2022.01)

(52) U.S. Cl.
CPC ....... *B60W 50/14* (2013.01); *B60W 2050/146* (2013.01); *B60W 2420/403* (2013.01); *B60W 2540/215* (2020.02); *B60W 2556/10* (2020.02)

(58) Field of Classification Search
CPC ..... B60W 2420/403; B60W 2540/215; B60W 2556/10; G08G 1/143; G08G 1/144; G08G 1/146; G08G 1/147; B62D 15/0285; G05B 23/0221
USPC ...................... 340/932.2, 933, 937, 936, 988
See application file for complete search history.

(56) References Cited

U.S. PATENT DOCUMENTS

| | | | | |
|---|---|---|---|---|
| 2018/0308358 | A1 | 10/2018 | Hayakawa | |
| 2020/0180510 | A1* | 6/2020 | Suzuki | G06V 20/586 |
| 2020/0242936 | A1 | 7/2020 | Matsunaga et al. | |
| 2021/0107460 | A1* | 4/2021 | Minase | B60W 50/085 |
| 2021/0323539 | A1* | 10/2021 | Muto | G08G 1/168 |
| 2022/0237927 | A1* | 7/2022 | Hiei | G06V 10/60 |

* cited by examiner

CONTROL DEVICE, CONTROL METHOD, AND CONTROL PROGRAM

CROSS-REFERENCE TO RELATED APPLICATIONS

This application is based on and claims priority under 35 USC 119 from Japanese Patent Application No. 2022-169833 filed on Oct. 24, 2022.

TECHNICAL FIELD

The present disclosure relates to a control device, a control method, and a control program.

BACKGROUND ART

In recent years, countermeasures have actively been taken to provide access to sustainable transportation systems considering vulnerable people among traffic participants. Research and development have been focused on further improvement in traffic safety and convenience through research and development for automatic driving technologies.

In the related art, automatic parking control for detecting parking spaces and moving and parking vehicles automatically in the detected parking spaces has been known. Automatic parking control for registering designated parking spaces in advance, detecting the registered parking spaces, and moving and parking vehicles automatically has been also known. JP 2020-117128 A discloses a control device in which feature point information around a vehicle is acquired based on image data acquired from start to end of automatic parking when a first instruction is received, the feature point information is stored in association with parking positions, actual feature point information is acquired based on image data when a second instruction is received, and automatic parking is performed based on the stored feature point information and the actual feature point information.

Incidentally, when an automatic parking mode is selected during parking of a vehicle, both empty parking position detection for detecting a simply empty parking space and registered parking position detection for detecting a parking space registered in advance as a specific parking space are performed in some cases. Here, there is an automatic parking mode in which the empty parking position detection first starts, and for example, when a vehicle is stopped, the empty parking position detection ends and the registered parking position detection starts. However, in the case of the automatic parking mode, the registered parking position detection does not start when a vehicle is not stopped. Therefore, there is a problem that time is taken until a detection result of a registered parking position is displayed for a user. Accordingly, there is room for improvement in detection of a parking position.

SUMMARY OF INVENTION

An object of the present disclosure is to provide a control device, a control method, and a control program capable of shortening time until a detection result of a registered parking position is displayed for a user and improving usability. Accordingly, it is possible to make contribution to development of a sustainable transportation system.

According to an aspect of the present disclosure, there is provided a control device for a moving body, the control device including an outside recognition unit configured to acquire recognition data which is data of an outside of the moving body, a parking candidate position detection unit configured to detect parking candidate positions of the moving body based on the recognition data, and a reception unit configured to receive a selection of a parking position of the moving body from a user of the moving body among the parking candidate positions, The parking candidate position detection unit is configured to be able to execute a first detection process of detecting an unregistered parking candidate position and a second detection process of detecting a registered parking candidate position, start the first detection process based on an operation by the user, stop the first detection process when detecting that a movement speed of the moving body during movement of the moving body becomes equal to or less than a predetermined speed, and start the second detection process based on stopping of the first detection process.

According to another aspect of the present disclosure, there is provided a control method by a control device for a moving body, the control device including an outside recognition unit configured to acquire recognition data which is data of an outside of the moving body, a parking candidate position detection unit configured to detect parking candidate positions of the moving body based on the recognition data, and a reception unit configured to receive a selection of a parking position of the moving body from a user of the moving body among the parking candidate positions. A processor of the control device is configured to be able to execute a first detection process of detecting an unregistered parking candidate position and a second detection process of detecting a registered parking candidate position, start the first detection process based on an operation by the user, stop the first detection process when detecting that a movement speed of the moving body during movement of the moving body becomes equal to or less than a predetermined speed, and start the second detection process based on stopping of the first detection process.

According to another aspect of the present disclosure, there is provided a control program for a control device for a moving body, the control device including an outside recognition unit configured to acquire recognition data which is data of an outside of the moving body, a parking candidate position detection unit configured to detect parking candidate positions of the moving body based on the recognition data, and a reception unit configured to receive a selection of a parking position of the moving body from a user of the moving body among the parking candidate positions, the control program causing a processor of the control device to execute processes of being able to execute a first detection process of detecting an unregistered parking candidate position and a second detection process of detecting a registered parking candidate position, starting the first detection process based on an operation by the user, stopping the first detection process when detecting that a movement speed of the moving body during movement of the moving body becomes equal to or less than a predetermined speed, and starting the second detection process based on the stopping of the first detection process.

According to the present disclosure, it is possible to provide a control device, a control method, and a control program capable of shortening time until a detection result of a registered parking position is displayed for a user and improving usability.

DESCRIPTION OF EMBODIMENTS

Figure 1:
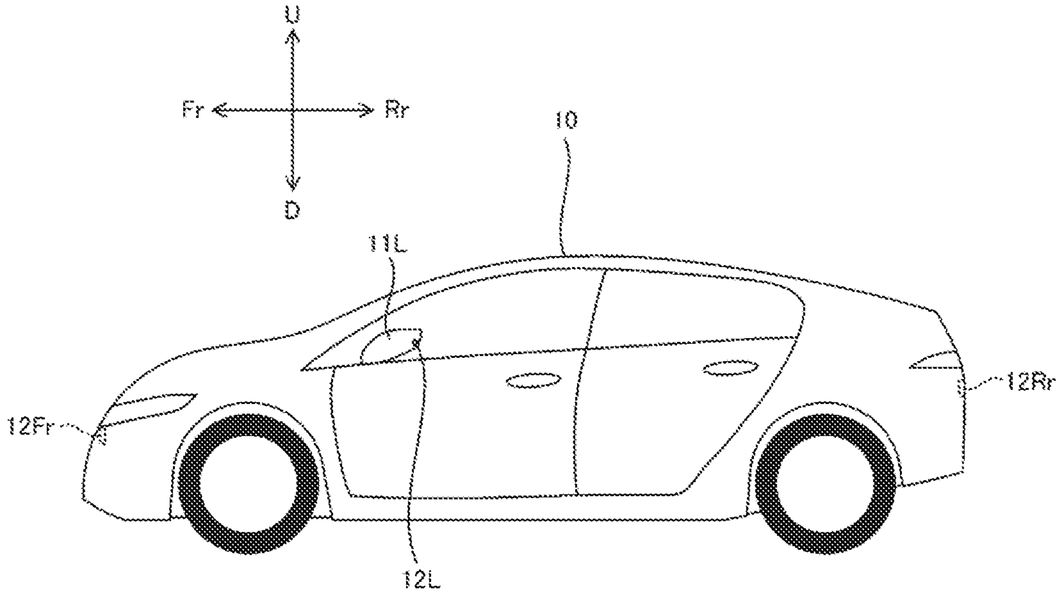
FIG. 1 is a side view illustrating an example of a vehicle in which a control device according to an embodiment is mounted.

Hereinafter, a control device, a control method, and a control program according to the present disclosure will be described with reference to the appended drawings. It is assumed that the drawings are viewed in directions of reference numerals. In the present specification or the like, to simplify and clarify description, front and rear directions, left and right directions, and up and down directions are described in directions viewed from a driver of a vehicle 10 illustrated in FIGS. 1 and 2. In the drawings, Fr, Rr, L, R, U, and D denote front, rear, left, right, up, and down sides of the vehicle 10, respectively.

<Vehicle 10 Mounted with Moving Body Control Device According to Present Disclosure>

Figure 2:
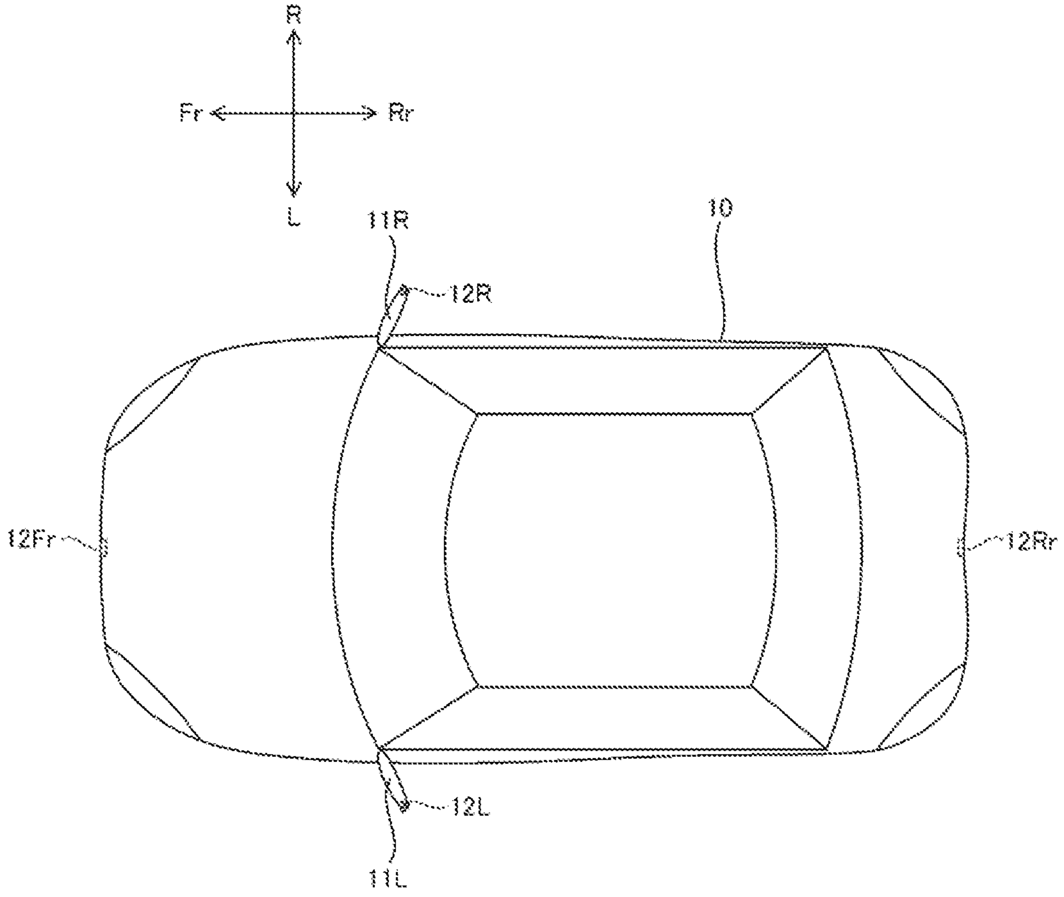
FIG. 2 is a top view illustrating the vehicle illustrated in FIG. 1.

FIG. 1 is a side view illustrating the vehicle 10 in which a control device according to the present disclosure is mounted. FIG. 2 is a top view illustrating the vehicle 10 illustrated in FIG. 1. The vehicle 10 is an example of a moving body according to the present disclosure.

The vehicle 10 is an automobile which includes a driving source (not illustrated) and wheels including a driving wheel driven by power of the driving source and a steerable steering wheel. In the embodiment, the vehicle 10 is a four-wheel automobile which includes a pair of left and right front wheels and a pair of left and right rear wheels. The driving source of the vehicle 10 is, for example, an electric motor. The driving source of the vehicle 10 may be an internal combustion engine such as a gasoline engine or a diesel engine, or may be a combination of an electric motor and an internal combustion engine. The driving source of the vehicle 10 may drive the pair of left and right front wheels, may drive the pair of left and right rear wheels, or may drive the pairs of left and right front and rear wheels. The front and rear wheels may be both steerable steering wheels or any one thereof may be a steerable steering wheel.

The vehicle 10 further includes side mirrors 11L and 11R. The side mirrors 11L and 11R are mirrors (rearview mirrors) provided in the outside of the front doors of the vehicle 10 and used for the driver to check the rear side and the rear lateral side. The side mirrors 11L and 11R are fixed to the body of the vehicle 10 by rotational shafts extending in the vertical direction and can be opened and closed by rotating about the rotational shafts.

The vehicle 10 further includes a front camera 12Fr, a rear camera 12Rr, a left side camera 12L, and a right side camera 12R. The front camera 12Fr is a digital camera which is provided in the front of the vehicle 10 and captures the front side of the vehicle 10. The rear camera 12Rr is a digital camera which is provided in the rear of the vehicle 10 and captures the rear side of the vehicle 10. The left side camera 12L is a digital camera which is provided in the left side mirror 11L of the vehicle 10 and captures the left side of the vehicle 10. The right side camera 12R is a digital camera which is provided in the right side mirror 11R of the vehicle 10 and captures the right side of the vehicle 10.

<Internal Configuration of Vehicle 10>

Figure 3:
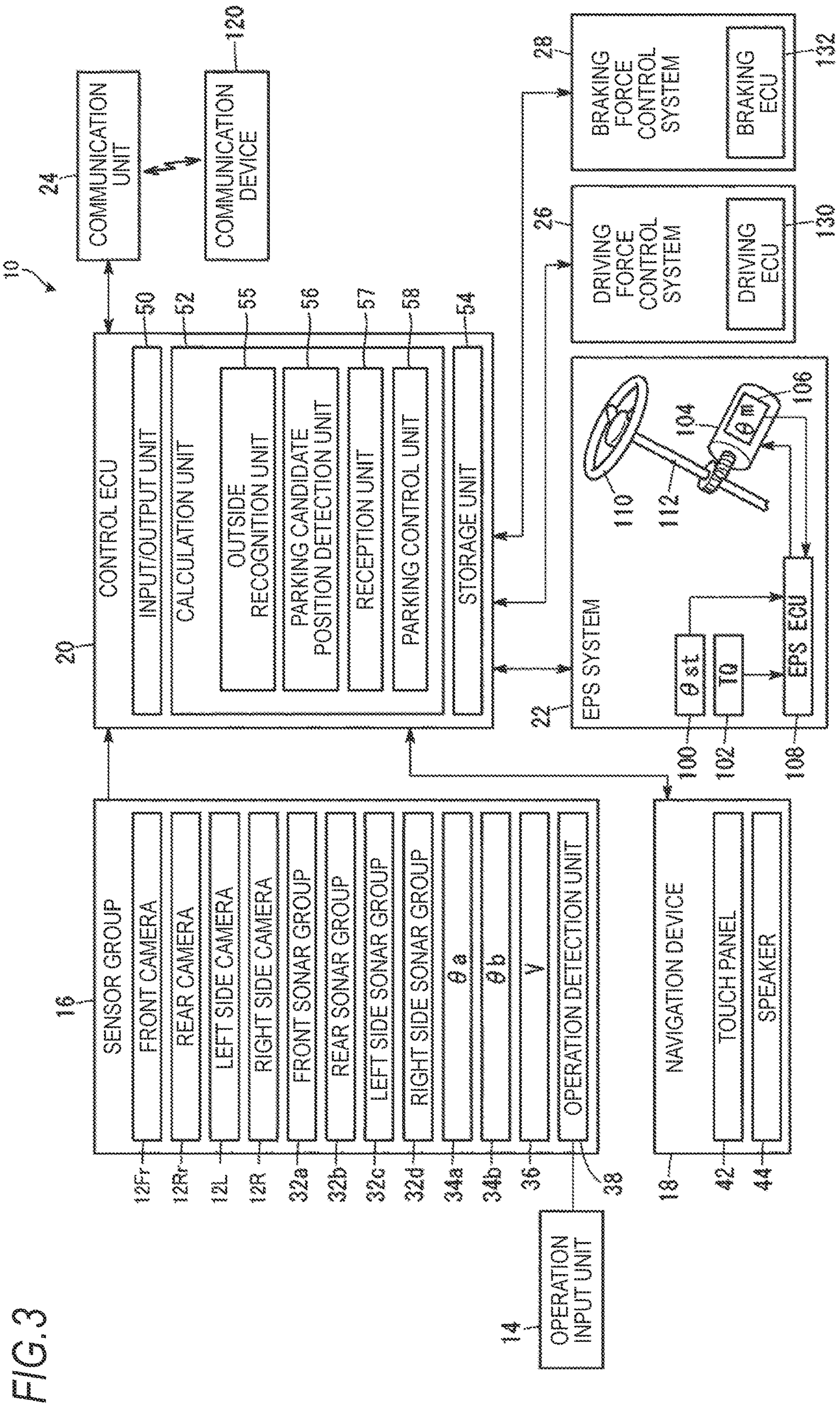
FIG. 3 is a block diagram illustrating an internal configuration of the vehicle illustrated in FIG. 1.

FIG. 3 is a block diagram illustrating an example of an internal configuration of the vehicle 10 illustrated in FIG. 1. As illustrated in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detected values used for control by the control ECU 20. The sensor group 16 includes the front camera 12Fr, a rear camera 12Rr, the left side camera 12L, and the right side camera 12R. The sensor group 16 includes a front sonar group 32*a*, a rear sonar group 32*b*, a left side sonar group 32*c*, and a right side sonar group 32*d*. The sensor group 16 includes wheel sensors 34*a* and 34*b*, a vehicle speed sensor 36, and an operation detection unit 38.

The front camera 12Fr, the rear camera 12Rr, the left side camera 12L, and the right side camera 12R acquire outside recognition data (for example, peripheral images) for recognizing the outside of the vehicle 10 by capturing the periphery of the vehicle 10. The peripheral images captured by the front camera 12Fr, the rear camera 12Rr, the left side camera 12L, and the right side camera 12R are referred to as a front image, a rear image, a left side image, and a right side image, respectively. Images formed by the left side image and the right side image may also be referred to as side images.

The front sonar group 32*a*, the rear sonar group 32*b*, the left side sonar group 32*c*, and the right side sonar group 32*d* emit ultrasonic waves to the periphery of the vehicle 10 and receive waves reflected from other objects. The front sonar group 32*a* includes, for example, four sonars. The sonars included in the front sonar group 32*a* are respectively provided in diagonally left front, left front, right front, and diagonally right front of the vehicle 10. The rear sonar group 32*b* includes, for example, four sonars. The sonars included in the rear sonar group 32*b* are respectively provided in diagonally left rear, left rear, right rear, and diagonally right rear of the vehicle 10. The left side sonar group 32*c* includes, for example, two sonars. The sonars included in the left side sonar group 32*c* are provided in left side front and left side rear of the vehicle 10. The right side sonar group 32*d* includes, for example, two sonars. The sonars included in the right side sonar group 32*d* are provided in right side front and right side rear of the vehicle 10.

The wheel sensors 34*a* and 34*b* detect rotational angles of the wheels of the vehicle 10. The wheel sensors 34*a* and 34*b* may be configured with angle sensors or may be configured with displacement sensors. The wheel sensors 34*a* and 34*b* output detection pulses whenever the wheels are rotated by a predetermined angle. The detection pulses output from the wheel sensors 34*a* and 34*b* are used to calculate a rotational angle of the wheels and a rotational speed of the wheels. Based on the rotational angle of the wheels, a movement distance of the vehicle 10 is calculated. The wheel sensor 34*a* detects, for example, a rotational angle θa of the left rear wheel. The wheel sensor 34*b* detects, for example, a rotational angle θb of the right rear wheel.

The vehicle speed sensor 36 detects a speed of the body of the vehicle 10, that is, a vehicle speed V, and outputs the detected vehicle speed V to the control ECU 20. The vehicle speed sensor 36 detects the vehicle speed V based on, for example, rotation of a counter shaft of a transmission.

The operation detection unit 38 detects operation content performed by a user using an operation input unit 14 and outputs the detected operation content to the control ECU 20. The operation input unit 14 includes, for example, various user interfaces such as a side mirror switch switching between opening and closing states of the side mirrors 11L and 11R, and a shift lever (a select lever or a selector).

The navigation device 18 detects a current position of the vehicle 10 using, for example, a global positioning system (GPS), and guides the user along a route to a destination. The navigation device 18 includes a storage device (not illustrated) including a map information database.

The navigation device 18 includes a touch panel 42 and a speaker 44. The touch panel 42 functions as an input device and a display device of the control ECU 20. The speaker 44 outputs various types of guide information by a sound to a user (passenger) of the vehicle 10.

The touch panel 42 is configured such that various instructions can be input to the control ECU 20. For example, the user can input an instruction related to movement support of the vehicle 10 via the touch panel 42. The movement support includes parking support and leaving support of the vehicle 10. The touch panel 42 is configured to display various screens related to the control content of the control ECU 20. For example, a screen related to the movement support of the vehicle 10 is displayed on the touch panel 42. Specifically, a parking support button for requesting the parking support of the vehicle 10 and a leaving support button for requesting the leaving support are displayed on the touch panel 42. The parking support button includes an automatic parking button for requesting parking by automatic steering of the control ECU 20 and an assistant parking button for requesting assistance during parking by an operation of the driver. The leaving support button includes an automatic leaving button for requesting leaving by automatic steering of the control ECU 20 and an assistant leaving button for requesting assistance during leaving by an operation of the driver. A constituent other than the touch panel 42, for example, an information terminal such as a smartphone or a tablet terminal may be used as an input device or a display device.

For example, "parking" is stopping associated with boarding and descending of an occupant, and temporary stopping by a traffic signal and the like is excluded. "Parking position" is a position at which the moving body stops, that is, a position at which parking is performed.

The control ECU 20 includes an input/output unit 50, a calculation unit 52, and a storage unit 54. The calculation unit 52 is configured with, for example, a central processing unit (CPU). The calculation unit 52 performs various types of control by controlling each unit based on a program stored in the storage unit 54. The calculation unit 52 inputs and outputs a signal between each unit connected to the control ECU 20 via the input/output unit 50. The calculation unit 52 is an example of a control device according to the present invention.

The calculation unit 52 includes an outside recognition unit 55 which acquires outside recognition data of the vehicle 10, a parking candidate position detection unit 56 which detects parking candidate positions of the vehicle 10, a reception unit 57 which receives a selection of a parking position by a user among the parking candidate positions, and a parking control unit 58 which causes the vehicle 10 to park at the selected parking position.

The outside recognition unit 55 acquires peripheral images (outside recognition data) of the vehicle 10 captured by the front camera 12Fr, the rear camera 12Rr, the left side camera 12L, and the right side camera 12R from each camera. The outside recognition unit 55 can also acquire outside recognition data of the vehicle 10 acquired by the sonar groups 32*a* to 32*d* or a radar.

The parking candidate position detection unit 56 detects parking candidate positions at which the vehicle 10 is to be parked based on the outside recognition data. The parking candidate position detection unit 56 can perform an unregistered candidate detection process of detecting unregistered candidate positions and a registered candidate detection process of detecting registered parking candidate positions. The unregistered candidate detection process is a first detection process according to the present invention. The registered candidate detection process is a second detection process according to the present invention.

The unregistered candidate detection process is a process of detecting parking candidate positions at which the vehicle 10 can be parked in a recognition space detected from the outside recognition data. In the unregistered candidate detection process, for example, a parking space is detected by frame line recognition for recognizing a parking frame, space recognition for recognizing an empty parking space, or the like. The parking frame is a white-line frame or the like displayed in a parking lot to park a vehicle. The empty parking space is a space or the like where the vehicle can be merely parked.

The registered candidate detection process is a process of detecting registered parking candidate positions previous registered as designated parking positions by the user in a recognition space detected from the outside recognition data. The designated parking position is a specific parking position for the user, for example, a parking space where there are many opportunities to frequently park the vehicle 10 of the user. The designated parking positions include, for example, monthly parking lot, a home parking lot, and a coin parking lot of which a parking frequency is high. In the registered candidate detection process, registered parking candidate positions are detected by comparing feature points of current outside recognition data with feature points of the outside recognition data when the user previously registered the registered parking candidate positions.

The parking candidate position detection unit 56 starts the unregistered candidate detection process based on an operation of starting the parking control by the user, stops the unregistered candidate detection process when detecting that a movement speed of the vehicle during movement of the vehicle 10 becomes equal to or less than a predetermined speed, and starts the registered candidate detection process based on the stopping of the unregistered candidate detection process. The operation of starting the parking control is, for example, starting of an automatic parking mode for starting the automatic parking of the vehicle 10. The movement speed of the vehicle 10 is, for example, a speed at which the vehicle 10 is traveling in a parking facility to find a parking space. The predetermined speed is, for example, 5 to 10 [km/h].

The parking candidate position detection unit 56 stops the registered candidate detection process when detecting that the movement speed of the vehicle 10 becomes equal to or greater than the predetermined speed after the start of the registered candidate detection process, and resumes the unregistered candidate detection process based on the stopping of the registered candidate detection process. The parking candidate position detection unit 56 may stop the registered candidate detection process when detecting that the movement distance of the vehicle 10 becomes equal to or greater than a predetermined distance after the starting of the registered candidate detection process and may resume the unregistered candidate detection process based on the stopping of the registered candidate detection process.

The parking candidate position detection unit 56 may stop the unregistered candidate detection process when detecting that the movement speed of the vehicle 10 during the movement of the vehicle 10 becomes equal to or less than a first speed, start the registered candidate detection process, then stop the registered candidate detection process when detecting that the movement speed of the vehicle 10 becomes equal to or greater than a second speed which is greater than the first speed, and resume the unregistered candidate detection process based on the stopping of the registered candidate detection process. The first speed is, for example, 5 to 10 [km/h].

The parking candidate position detection unit 56 resumes the unregistered candidate detection process, then stops the unregistered candidate detection process based on the stopping of the vehicle 10, and resumes the registered candidate detection process based on the stopping of the unregistered candidate detection process.

The parking candidate position detection unit 56 registers a predetermined parking position designated by the user as a designated parking position in the storage unit 54. The parking candidate position detection unit 56 registers feature points in the outside recognition data of the vehicle 10 in association with the registered designated parking position. The outside recognition data for detecting the feature points are peripheral images of the periphery of the vehicle 10 captured by the front camera 12Fr, the rear camera 12Rr, the left side camera 12L, and the right side camera 12R. The designated parking position is registered in the storage unit 54 as a map including the feature points in the peripheral images of the vehicle 10.

The parking candidate position detection unit 56 compares the feature points of the outside recognition data corresponding to a currently detected parking candidate position with the feature points of the outside recognition data corresponding to the designated parking position previously registered by the user, and determines that the currently detected parking candidate position is a registered parking candidate position when a matching rate of the feature points is equal to or greater than a threshold.

The reception unit 57 receives the parking candidate position selected by the user among the parking candidate positions displayed on the touch panel 42 as a parking position of the vehicle 10. The reception unit 57 displays the unregistered parking candidate positions on the touch panel 42 and receives the selection of the parking position from the user when the unregistered parking candidate positions are detected based on the unregistered candidate detection process. The reception unit 57 displays the registered parking candidate positions on the touch panel 42 and receives a selection of the parking position from the user when the registered parking candidate positions are detected based on the registered candidate detection process. The reception unit 57 displays the unregistered parking candidate positions and the registered parking candidate positions in different modes on the touch panel 42 when the unregistered parking candidate positions are detected based on the unregistered candidate detection process and the registered parking candidate positions are detected based on the registered candidate detection process. The different modes include, for example, different display colors and thickness of different display lines.

The parking control unit 58 performs automatic parking support of the vehicle 10 by automatic steering in which an operation of a steering 110 is performed automatically under the control of the parking control unit 58. In the automatic steering support, operations on an acceleration pedal (not illustrated), a brake pedal (not illustrated), and the operation input unit 14 are automatically performed. The parking control unit 58 performs assistant parking support when the driver performs the operations on the acceleration pedal, the brake pedal, and the operation input unit 14 and manually parks the vehicle 10.

For example, the parking control unit 58 performs automatic parking control and assistant parking control to park the vehicle 10 at the selected parking candidate position based on the outside recognition data of the vehicle 10 acquired by the front camera 12Fr, the rear camera 12Rr, the left side camera 12L, and the right side camera 12R and the selection of the parking position by the user.

The EPS system 22 includes a steering angle sensor 100, a torque sensor 102, an EPS motor 104, a resolver 106, and an EPS ECU 108. The steering angle sensor 100 detects a steering angle $\theta st$ of the steering 110. The torque sensor 102 detects a torque TQ applied to the steering 110.

The EPS motor 104 enables automatic steering while supporting operation or parking of the steering 110 by an occupant by applying a driving force or a reaction force to a steering column 112 connected to the steering 110. The resolver 106 detects a rotational angle $\theta m$ of the EPS motor 104. The EPS ECU 108 is in charge of controlling the entire EPS system 22. The EPS ECU 108 includes an input/output unit (not illustrated), a calculation unit (not illustrated), and a storage unit (not illustrated).

The communication unit 24 enables wireless communication with another communication device 120. The other communication device 120 is an information terminal such as a base station, a communication device of another vehicle, or a smartphone carried by a passenger of the vehicle 10.

The driving force control system 26 includes a driving ECU 130. The driving force control system 26 performs driving force control of the vehicle 10. The driving ECU 130 controls a driving force of the vehicle 10 by controlling an engine or the like (not illustrated) based on an operation on the acceleration pedal (not illustrated) by the user.

The braking force control system 28 includes a braking ECU 132. The braking force control system 28 performs braking force control of the vehicle 10. The braking ECU 132 controls a braking force of the vehicle 10 by controlling a brake mechanism or the like (not illustrated) based on an operation on the brake pedal (not illustrated) by the user.

<Registration of Designated Parking Position>

Next, a designated parking position of the vehicle 10 registered by the user will be described with reference to FIGS. 4 to 6.

Figure 4:
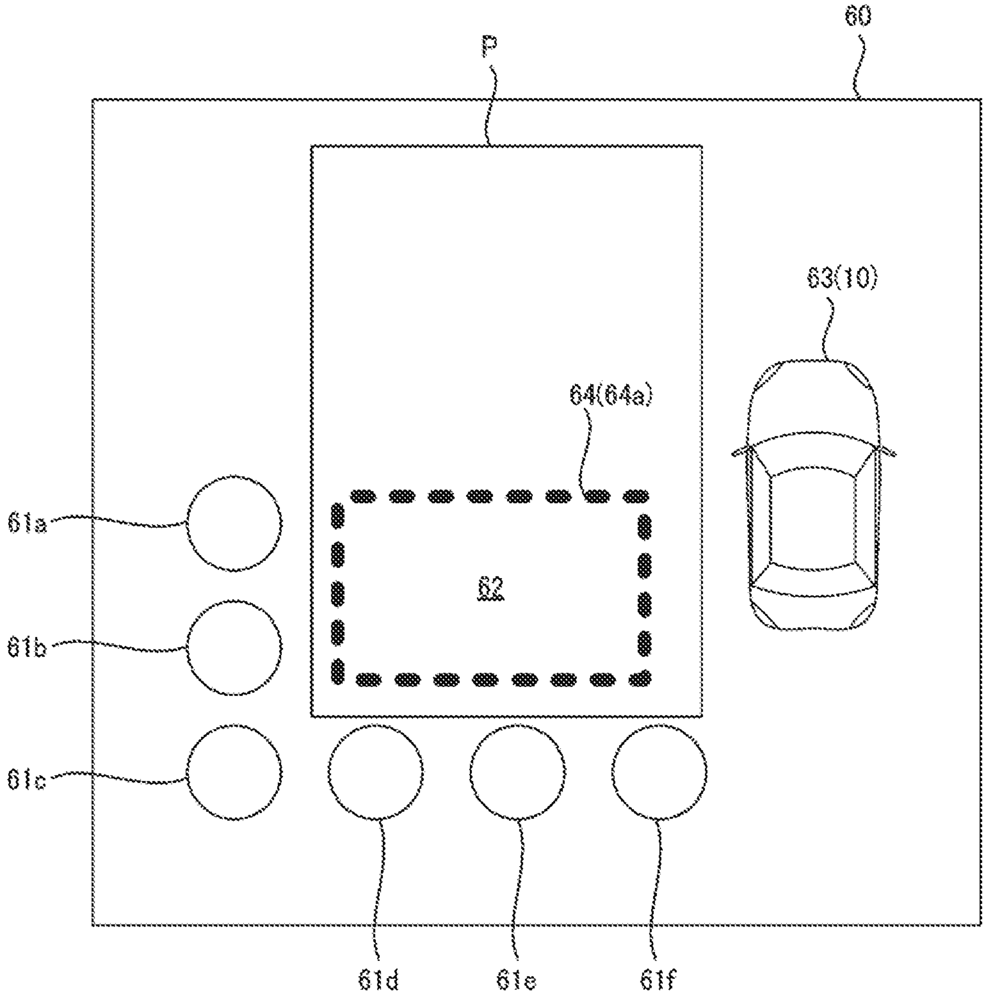
FIG. 4 is a diagram illustrating an example of a bird's-eye view image generated according to outside recognition data of the vehicle.

FIG. 4 is a diagram illustrating an example of a bird's-eye view image 60 (a synthesized image) generated according to the outside recognition data of the vehicle 10 acquired by the front camera 12Fr, the rear camera 12Rr, the left side camera 12L, and the right side camera 12R. The bird's-eye view image 60 is displayed on, for example, the touch panel 42 of the vehicle 10. In the bird's-eye view image 60 illustrated in FIG. 4, a parking lot P and a plurality of plantings (obstacles) 61*a* to 61*f* are captured. The user of the vehicle 10 rents a parking region 62 set on the obstacles 61*a* to 61*f* side in the parking lot P as a monthly parking lot. A vehicle stopping in front of the parking lot P is an image in which the vehicle is viewed from the upper side and is a vehicle image 63 generated (captured) in advance and stored in the storage unit 54 or the like.

The user can set the parking region 62 as a designated parking position 64 by a manual setting of performing a touch operation on the touch panel 42. The manual setting of the designated parking position 64 is a setting in which a rectangular dotted frame 64*a* displayed on the touch panel 42 is moved by a touch operation and the parking region 62 is set to be surrounded by the dotted frame 64*a* as illustrated in FIG. 4. Accordingly, the dotted frame 64*a* set to surround the parking region 62 is set as the designated parking position 64.

Figure 5:
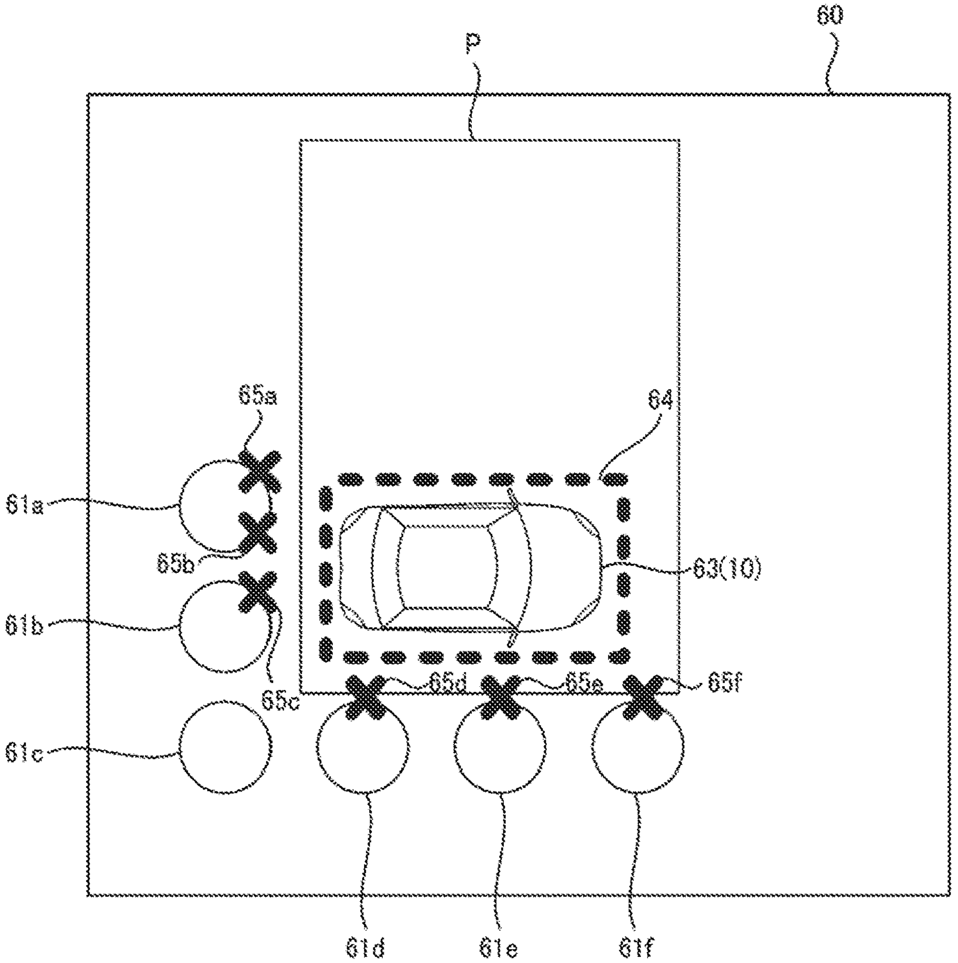
FIG. 5 is a diagram illustrating peripheral feature points corresponding to a designated parking position.

FIG. 5 is a diagram illustrating feature points of the periphery of the designated parking position 64 illustrated in FIG. 4. When the designated parking position 64 is set, feature points corresponding to the designated parking position 64 are detected by the parking candidate position detection unit 56 in the outside recognition data acquired by the front camera 12Fr, the rear camera 12Rr, the left side camera 12L, and the right side camera 12R. For example, as illustrated in FIG. 5, obstacle feature points 65*a* to 65*f* and the like indicating positions of the obstacles 61*a* to 61*f* located in the periphery of the designated parking position 64 are detected by the parking candidate position detection unit 56 as feature points corresponding to the designated parking position 64. FIG. 5 illustrates a state in which the vehicle 10 is parked at the designated parking position 64.

Figure 6:
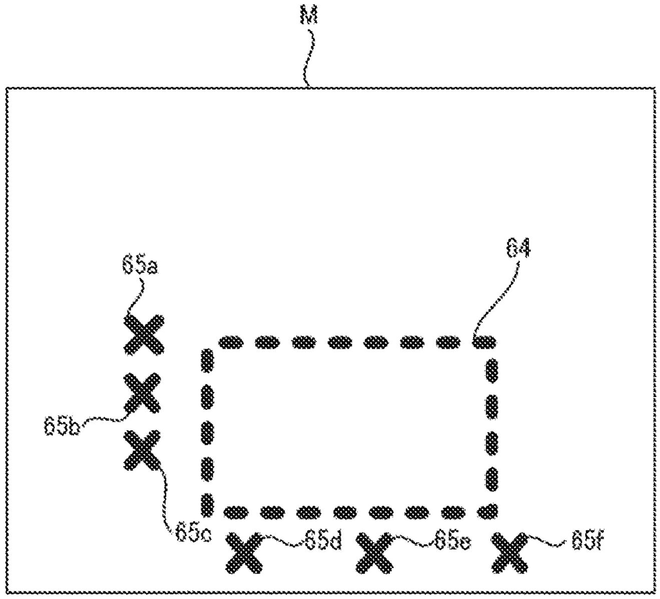
FIG. 6 is a diagram illustrating an example of a map of a designated parking position registered in a storage unit.

FIG. 6 is a diagram illustrating an example of a map of the designated parking position 64 registered in the storage unit 54. When the feature points (the obstacle feature points 65*a* to 65*f*) corresponding to the designated parking position 64 are detected, the designated parking position 64 is registered as a map M indicating association between the detected obstacle feature points 65*a* to 65*f* and the set designated parking position 64 in the storage unit 54.

<Process of Calculation Unit 52 in Automatic Parking>

Figure 7:
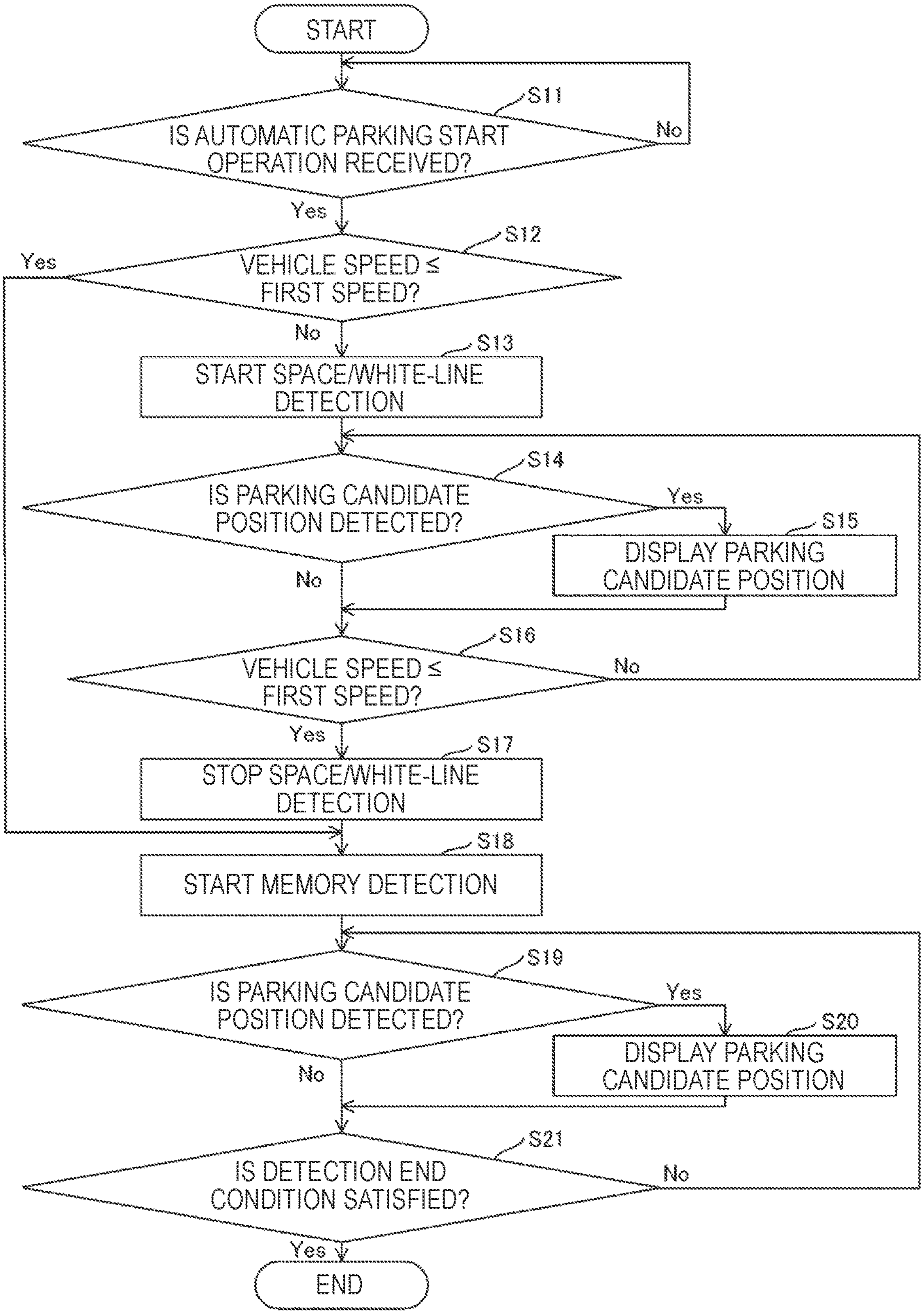
FIG. 7 is a flowchart illustrating an example of a detection process for parking candidate positions by a calculation unit.

Next, a detection process of parking candidate positions by the calculation unit 52 in automatic parking will be described. FIG. 7 is a flowchart illustrating an example of the detection process of the parking candidate positions by the calculation unit 52. The calculation unit 52 starts a process illustrated in FIG. 7 when a touch operation is performed on an automatic parking button displayed on the touch panel 42. For example, when the user who wants to park the vehicle 10 arrives at the vicinity of the parking lot, the user performs the touch operation on the automatic parking button.

First, the parking candidate position detection unit 56 of the calculation unit 52 determines whether to receive an automatic parking start operation to start the automatic parking of the vehicle 10 (step S11). The automatic parking start operation is, for example, a touch operation on the automatic parking button displayed on the touch panel 42.

When the automatic parking start operation is not received in step S11 (No in step S11), the parking candidate position detection unit 56 repeats the process of step S11. When the automatic parking start operation is received in step S11 (Yes in step S11), the parking candidate position detection unit 56 determines whether a movement speed of the vehicle 10 is equal to or less than the first speed (step S12). The first speed is, for example, 5 to 10 [km/h].

When the movement speed of the vehicle 10 is not equal to or less than the first speed in step S12, that is, when the vehicle 10 is moving at a speed faster than the first speed in the parking facility (No in step S12), the parking candidate position detection unit 56 starts detection of a space/white-line in the parking lot, that is, the unregistered candidate detection process of detecting an empty space or the like where the vehicle 10 can be parked (step S13). The parking candidate position detection unit 56 detects the space/white-line based on peripheral images captured by the front camera 12Fr, the rear camera 12Rr, the left side camera 12L, and the right side camera 12R.

Subsequently, the parking candidate position detection unit 56 determines whether the space/white-line can be detected in the detection process of step S13, that is, whether the unregistered parking candidate position at which the vehicle 10 can be parked can be detected (step S14).

When the unregistered parking candidate position can be detected in step S14 (Yes in step S14), the reception unit 57 of the calculation unit 52 displays the detected unregistered parking candidate position on the touch panel 42 (step S15).

Subsequently, the parking candidate position detection unit 56 determines whether the movement speed of the vehicle 10 is equal to or less than the first speed (step S16). Conversely, when the unregistered parking candidate position cannot be detected in step S14 (No in step S14), the process proceeds to step S16 as it is and the parking candidate position detection unit 56 determines whether the movement speed of the vehicle 10 is equal to or less than the first speed.

When the movement speed of the vehicle 10 is not equal to or less than the first speed in step S16 (No in step S16), the parking candidate position detection unit 56 returns to step S14 to perform each process. When the movement speed of the vehicle 10 is equal to or less than the first speed in step S16 (Yes in step S16), the parking candidate position detection unit 56 stops detecting of the space/white-line in the parking lot, that is, the unregistered candidate detection process (step S17).

Subsequently, the parking candidate position detection unit 56 starts memory detection of the parking candidate position, that is, the registered candidate detection process of detecting the registered parking candidate position (step S18). Conversely, when the movement speed of the vehicle 10 is equal to or less than the first speed in step S12, that is, the speed of the vehicle 10 moving in the parking facility is equal to or less than the first speed (Yes in step S12), the process proceeds to step S18 as it is and the parking candidate position detection unit 56 starts the registered candidate detection process.

Subsequently, the parking candidate position detection unit 56 determines whether the memory detection for the parking candidate position can be performed in the detection process of step S18, that is, whether the registered parking candidate position can be detected (step S19).

When the registered parking candidate position can be detected in step S19 (Yes in step S19), the reception unit 57 displays the detected registered parking candidate position on the touch panel 42 (step S20).

Subsequently, the parking candidate position detection unit 56 determines whether a detection end condition of the parking candidate position detection is satisfied (step S21). Conversely, when the registered parking candidate position cannot be detected in step S19 (No in step S19), the process proceeds to step S21 as it is and the parking candidate position detection unit 56 determines whether the detection end condition of the parking candidate position detection is satisfied. The detection end condition is, for example, a selection of the unregistered parking candidate position or the registered parking candidate position displayed on the touch panel 42 by the user, a detection end operation of ending the detection process, or detection of the registered parking candidate position.

When the detection end condition of the registered parking candidate position detection is not satisfied in step S21 (No in step S21), the parking candidate position detection unit 56 returns to step S19 and performs each process. When the detection end condition of the registered parking candidate position detection is satisfied in step S21 (Yes in step S21), the parking candidate position detection unit 56 ends the detection process. Even when the detection end condition is satisfied in any step of the detection process, the parking candidate position detection unit 56 ends the detection process.

Figure 8:
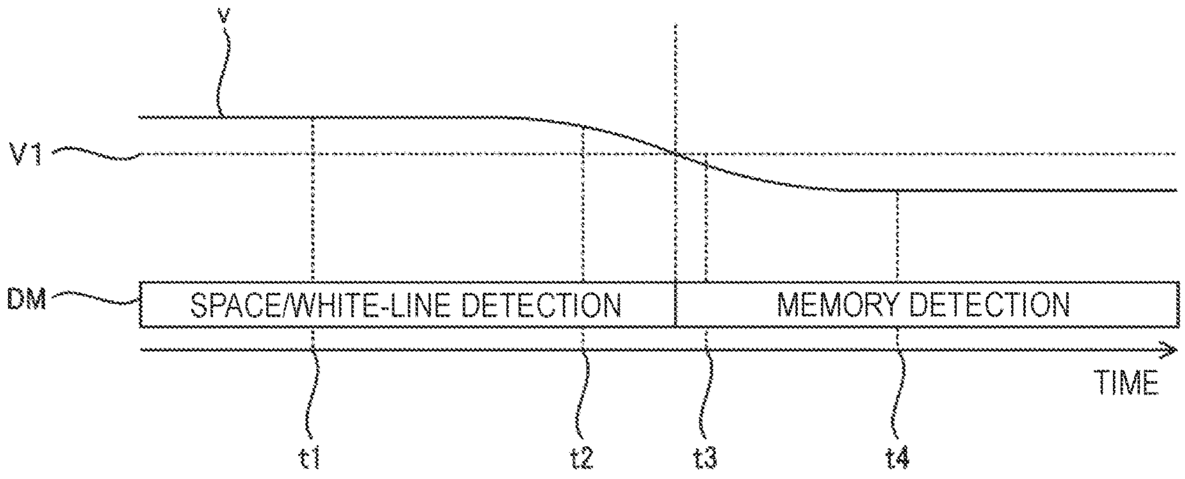
FIG. 8 is a diagram illustrating a relationship between a change in a movement speed of a vehicle in automatic parking and a change in a detection mode of parking candidate positions.

Subsequently, a relationship between the movement speed of the vehicle 10 and the detection of the parking candidate position will be described with reference to FIGS. 8 to 12. FIG. 8 is a diagram illustrating a relationship between a change in the movement speed of the vehicle 10 in the automatic parking and a change in a detection mode of the parking candidate position by the calculation unit 52.

When the user of the vehicle 10 in the parking facility operates, for example, the automatic parking button, the automatic parking control is started. A traveling range of the vehicle 10 is set to, for example, a drive range. When the user steps on a brake, the brake is released. When the movement of the vehicle 10 is started, the parking candidate position detection unit 56 of the calculation unit 52 starts the unregistered candidate detection process of detecting an empty space where the vehicle 10 can be parked.

For example, it is assumed that, after the vehicle 10 starts moving to detect the parking candidate position, and the movement speed is changed to, for example, a movement speed v illustrated in FIG. 8. When the movement speed v of the vehicle 10 is faster than the first speed V1 at, for example, time t1 and time t2, the parking candidate position detection unit 56 sets a detection mode DM of the parking candidate position to a mode of space/white-line detection and performs the unregistered candidate detection process.

When the movement speed v of the vehicle 10 is slowed down and becomes equal to or less than the first speed V1, that is, the movement speed v becomes equal to or less than the first speed V1 such as between time t2 to time t3 in FIG. 8, the parking candidate position detection unit 56 stops the mode of the space/white line detection of the parking candidate position and starts the mode of memory detection.

When the movement speed v of the vehicle 10 is equal to or less than the first speed V1 at, for example, time t3 and time t4, the parking candidate position detection unit 56 sets the detection mode DM of the parking candidate position to the mode of the memory detection and performs the registered candidate detection process.

Figure 9:
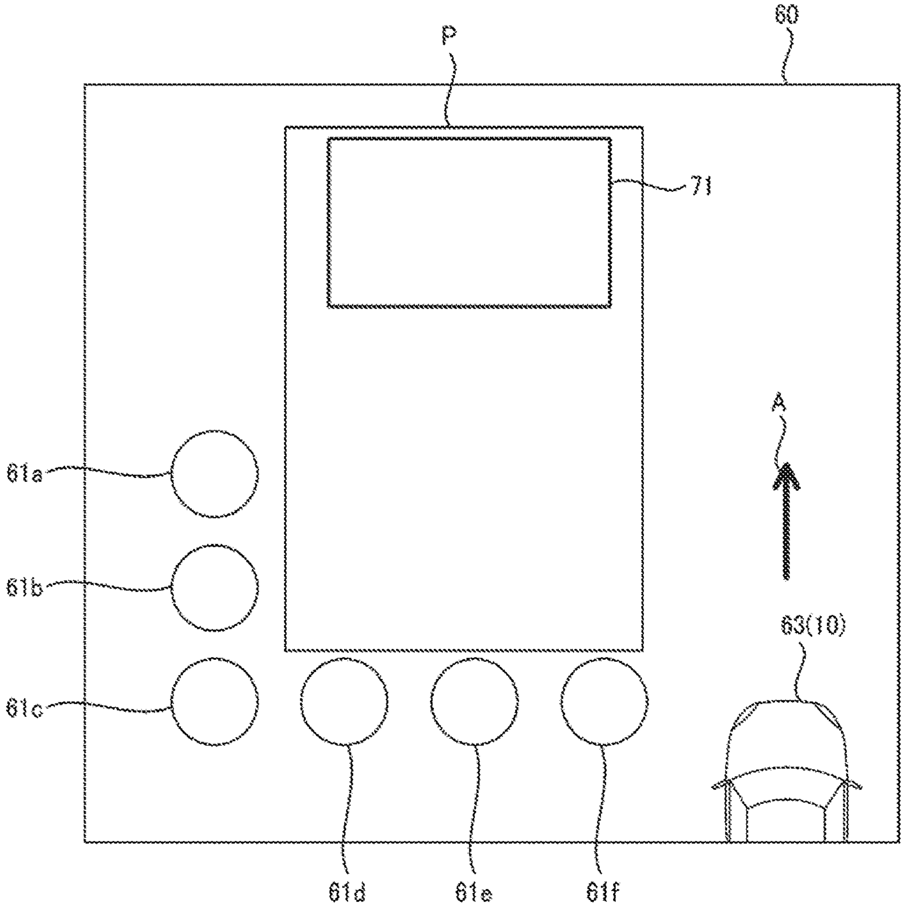
FIG. 9 is a diagram illustrating a bird's-eye view image displayed at time t1 in the automatic parking.

FIG. 9 is a diagram illustrating an example of the bird's-eye view image 60 displayed on the touch panel 42 of the vehicle 10 in the automatic parking of the vehicle 10. The bird's-eye view image 60 of FIG. 9 is an image indicating a detection situation of the parking candidate position at time t1 of FIG. 8. As illustrated in FIG. 9, the parking lot P, the plurality of plantings (obstacles) 61*a* to 61*f* located in the periphery of the parking lot P, and the vehicle moving in a direction indicated by an arrow A in the parking facility while looking for the parking position are captured in the bird's-eye view image 60. At time t1, the movement speed v of the vehicle 10 is a movement speed faster than the first speed V1 (see FIG. 8). Therefore, the parking candidate position detection unit 56 performs the unregistered candidate detection process of detecting the space/white-line. The parking candidate position detection unit 56 detects an unregistered parking candidate position 71 on the left front side in the parking lot P by the unregistered candidate detection process in a situation of FIG. 9. The reception unit 57 displays the detected unregistered parking candidate position 71 in, for example, a rectangular shape illustrated in FIG. 9. Accordingly, the displayed unregistered parking candidate position 71 becomes a parking candidate position which can be selected as a parking position at which the vehicle 10 is automatically parked.

Figure 10:
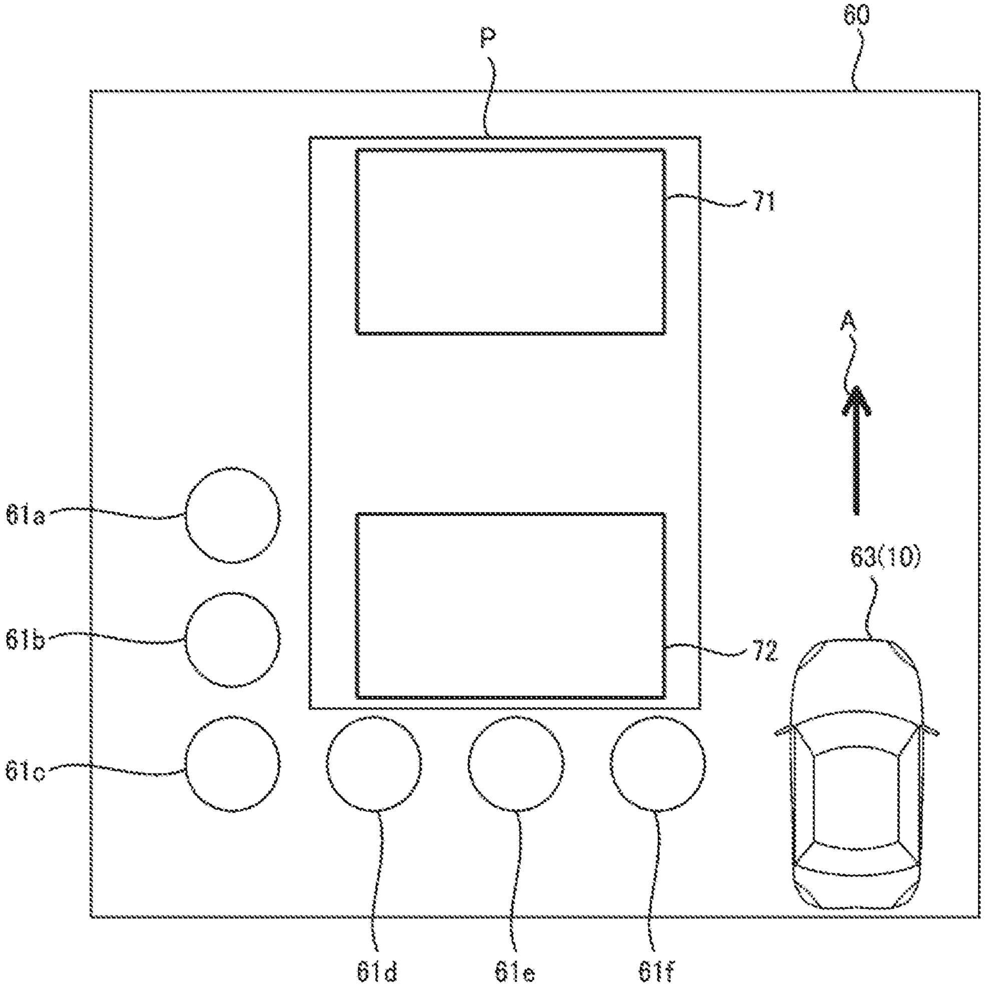
FIG. 10 is a diagram illustrating a bird's-eye view image displayed at time t2 in the automatic parking.

The bird's-eye view image 60 of FIG. 10 is an image indicating a detection situation of the parking candidate position at time t2 of FIG. 8. As illustrated in FIG. 10, the vehicle 10 at time t2 is moved to a position advanced in the direction indicated by the arrow A compared to the vehicle 10 at time t1 (see FIG. 9). The movement speed v of the vehicle 10 at time t2 is a movement speed faster than the first speed V1 (see FIG. 8) like at time t1. Therefore, the parking candidate position detection unit 56 continues the unregistered candidate detection process of detecting the space/white-line. The advancing vehicle 10 further advances to the position indicated by the arrow A than the positions at which the obstacles 61*c* to 61*f* are located. Therefore, the parking candidate position detection unit 56 detects an unregistered parking candidate position 72 as a parking space of a region close to the obstacles 61*a* to 61*f* in addition to the unregistered parking candidate position 71 in the parking P in the unregistered candidate detection process in the situation of FIG. 10. The reception unit 57 displays the detected unregistered parking candidate position 72 as a rectangular shape like the parking candidate position 71 in FIG. 10. Accordingly, the displayed unregistered parking candidate positions 71 and 72 become the parking candidate positions which can be selected as parking positions at which the vehicle 10 can be automatically parked.

Figure 11:
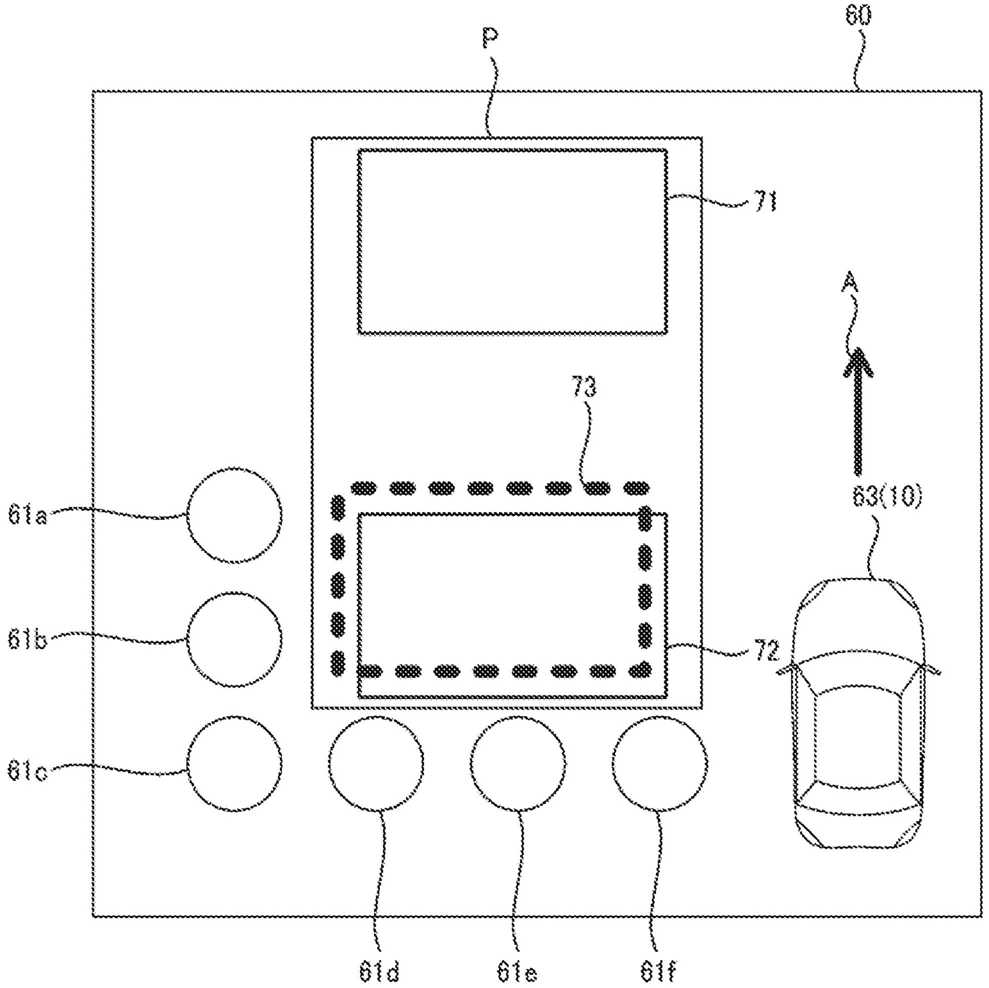
FIG. 11 is a diagram illustrating a bird's-eye view image displayed at time t3 in the automatic parking.

The bird's-eye view image 60 of FIG. 11 is an image indicating a detection situation of the parking candidate position in time t3 of FIG. 8. As illustrated in FIG. 11, the vehicle 10 at time t3 is moving to a further advanced position in the direction indicated by the arrow A compared to the vehicle 10 at time t2 (see FIG. 10). The movement speed v of the vehicle 10 at time t3 becomes slower than the movement speed v at time t2 and becomes the movement speed v equal to or less than the first speed V1 (see FIG. 8). Therefore, the parking candidate position detection unit 56 starts the registered candidate detection process of detecting a registered parking candidate position (for example, a parking candidate position 73 indicated by a dotted line).

Figure 12:
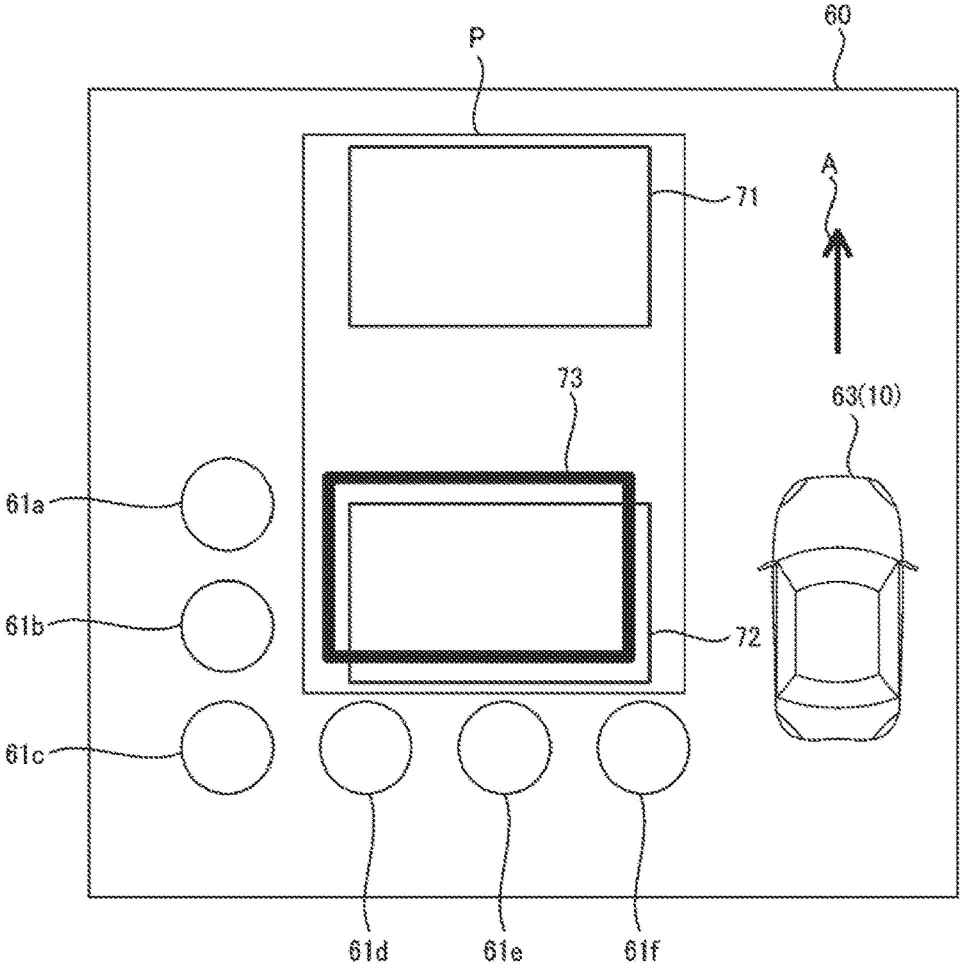
FIG. 12 is a diagram illustrating a bird's-eye view image displayed at time t4 in the automatic parking.

The bird's-eye view image 60 of FIG. 12 is an image indicating a detection situation of a parking candidate position at time t4 of FIG. 8. As illustrated in FIG. 12, the vehicle 10 at time t4 is moved to a position further advanced in the direction indicated by the arrow A compared to the vehicle 10 (see FIG. 11) at time t3. The movement speed v of the vehicle 10 at time t4 is a movement speed equal to or less than the first speed V1 (see FIG. 8) like at time t3. Therefore, the parking candidate position detection unit 56 continues the registered candidate detection process of detecting the registered parking candidate position. The parking candidate position detection unit 56 detects the registered parking candidate position 73, which is in the parking lot P, in the registered candidate detection process in the situation of FIG. 12. The reception unit 57 displays the detected registered parking candidate position 73 as, for example, a solid-line rectangular shape as illustrated in FIG. 12. The registered parking candidate position 73 illustrated in FIG. 12 corresponds to, for example, a registered parking candidate position registered previously as the designated parking position 64 (see FIG. 6) by the user. Accordingly, the displayed registered parking candidate position 73 becomes a parking candidate position which can be selected as a parking position at which the vehicle 10 can be automatically parked. In the detection process of the example, since the unregistered parking candidate positions 71 and 72 and the registered parking candidate position 73 are detected, the three parking candidate positions become the parking candidate positions which can be selected as the parking positions of the vehicle 10. The reception unit 57 displays the unregistered parking candidate positions 71 and 72 as, for example, parking candidate positions in a thin solid-line rectangular shape and displays the registered parking candidate position 73 as, for example, a parking candidate position in a thick solid-line rectangular shape.

Next, image examples displayed on the touch panel 42 in the detection process for the parking candidate positions in the automatic parking will be described with reference to FIGS. 13 and 14. The cases where the parking candidate positions 71 to 73 are displayed as the bird's-eye view image 60 on the touch panel 42 have been described above in FIGS. 9 to 12. For example, as illustrated in FIGS. 13 and 14, the parking candidate positions 71 to 73 may be displayed as 3-dimensional images.

Figure 13:
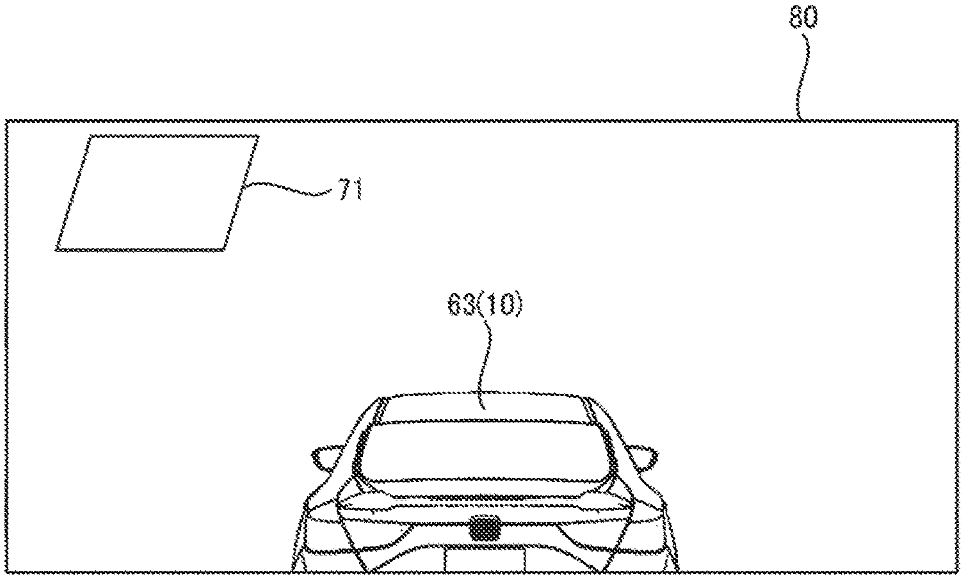
FIG. 13 is a diagram illustrating a 3-dimensional image corresponding to the bird's-eye view image in FIG. 9.

An image illustrated in FIG. 13 is a 3-dimensional image 80 corresponding to the bird's-eye view image 60 of FIG. 9. That is, the 3-dimensional image 80 of FIG. 13 is an image indicating a detection situation of the parking candidate position at time t1 at which the movement speed v of the vehicle 10 is faster than the first speed V1 (see FIG. 8). In the 3-dimensional image 80, the unregistered parking candidate position 71 detected in the unregistered candidate detection process is displayed to the left from the viewpoint of the vehicle 10.

Figure 14:
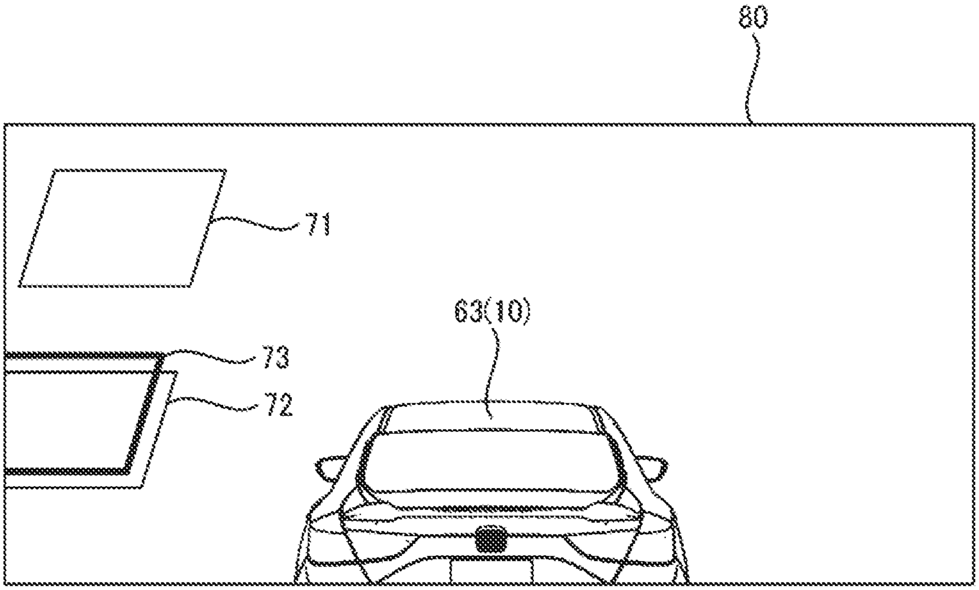
FIG. 14 is a diagram illustrating a 3-dimensional image corresponding to the bird's-eye view image in FIG. 12.

An image illustrated in FIG. 14 is a 3-dimensional image 80 corresponding to the bird's-eye view image 60 of FIG. 12. That is, the 3-dimensional image 80 in FIG. 14 is an image indicating a detection situation of the parking candidate position at time t4 at which the movement speed v of the vehicle 10 is equal to or less than the first speed V1 (see FIG. 8). In the 3-dimensional image 80, the registered parking candidate position 73 detected in the registered candidate detection process at time t4, the unregistered parking candidate position 71 detected in the unregistered candidate detection process at time t1, and the unregistered parking candidate position 72 detected in the unregistered candidate detection process at time t2 are displayed to the left from the viewpoint the vehicle 10.

As described above, the parking candidate position detection unit 56 of the calculation unit 52 starts the unregistered candidate detection process of detecting the unregistered parking candidate position based on a parking start operation of the vehicle 10 by the user, stops the unregistered candidate detection process when detecting that the movement speed v of the vehicle 10 during movement of the vehicle 10 becomes equal to or less than the first speed V1, and starts the registered candidate detection process of detecting the registered parking candidate position based on the stopping of the unregistered candidate detection process. In such configuration, it is possible to raise the movement speed of the vehicle 10 starting the registered candidate detection process and start the registered candidate detection process during the movement of the vehicle 10. Accordingly, since the registered candidate detection process can be started at an early stage of the parking control of the vehicle 10, time until the registered candidate detection process is completed and a processing result thereof is notified can be shortened, and thus usability is improved.

When an unregistered parking candidate position is detected based on the unregistered candidate detection process, the reception unit 57 of the calculation unit 52 displays the unregistered parking candidate position on the touch panel 42 and receives a selection of a parking position from the user. When a registered parking candidate position is detected based on the registered candidate detection process, the reception unit 57 displays the registered parking candidate position in a different mode from the unregistered parking candidate position on the touch panel 42 and receives a selection of a parking position from the user. Therefore, the user can easily distinguish the displayed unregistered parking candidate position and registered parking candidate position from each other and select a desired parking candidate position without error, and thus usability is improved.

<Modification of Detection Process for Parking Candidate Positions>

Figure 15:
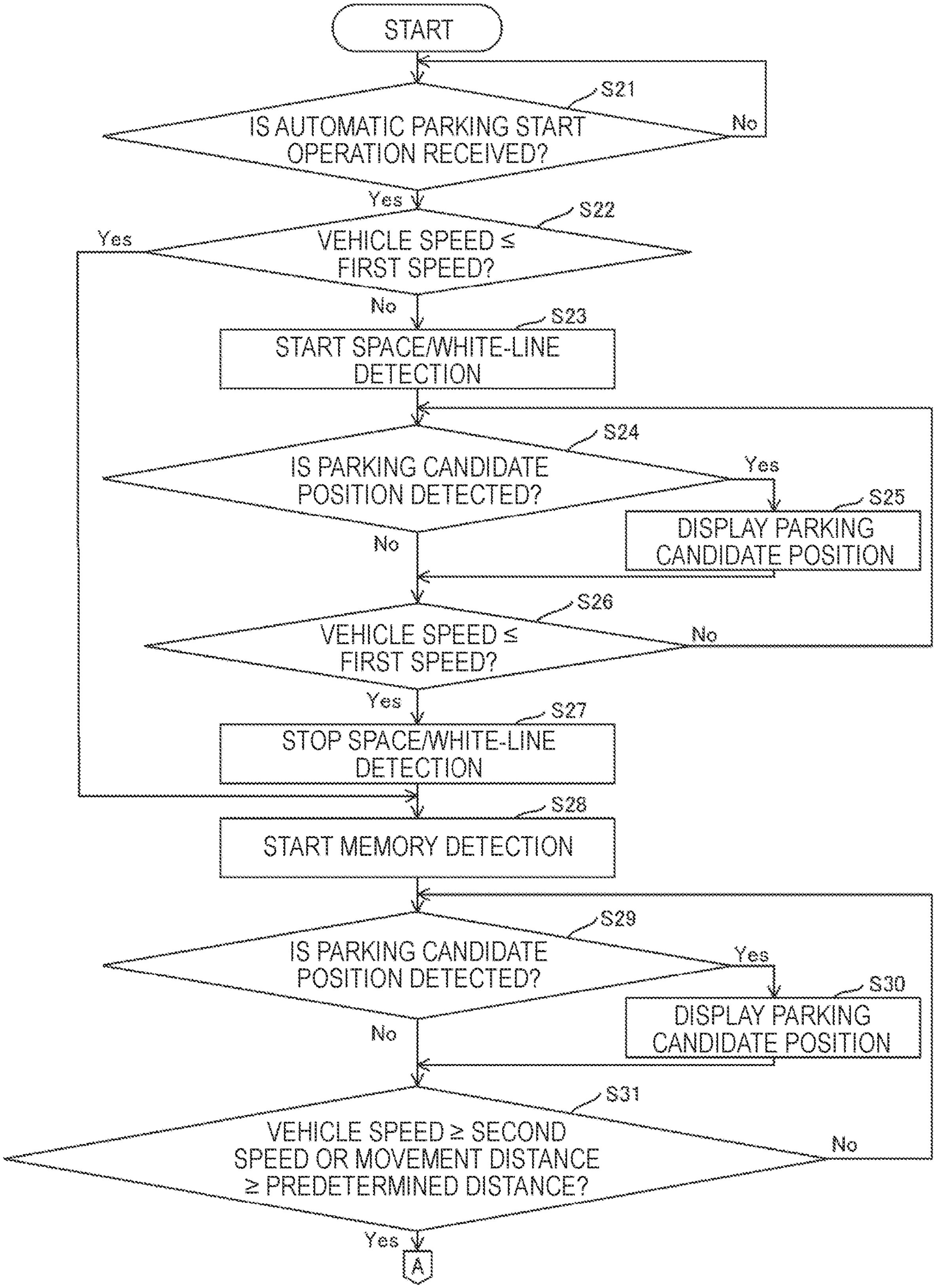
FIG. 15 is a flowchart illustrating a modification of the detection process for parking candidate positions by the calculation unit.
Figure 16:
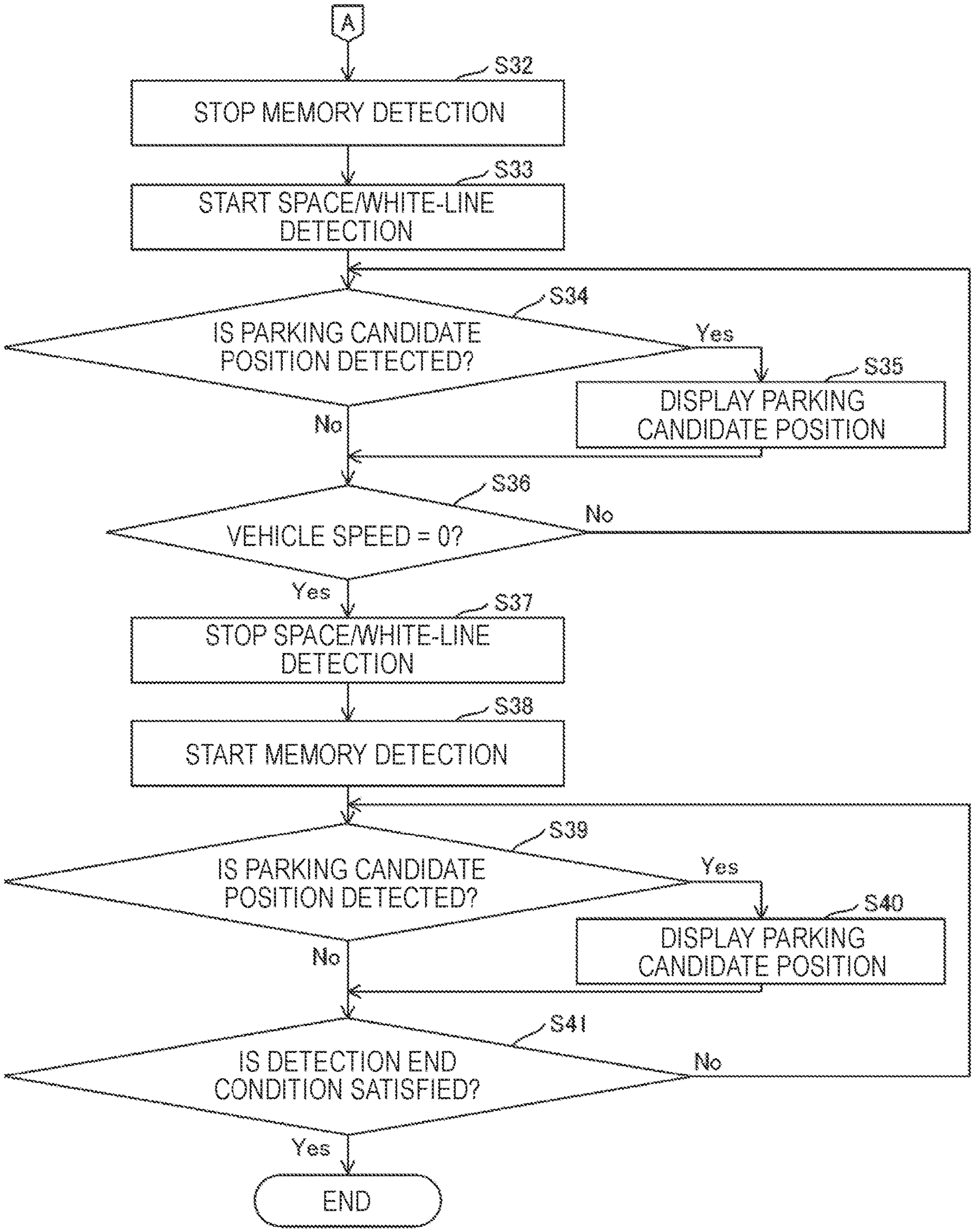
FIG. 16 is a flowchart illustrating a modification of the detection process for parking candidate positions by the calculation unit.

Next, a modification of the detection process for the parking candidate positions by the calculation unit 52 in the automatic parking will be described. FIGS. 15 and 16 are flowcharts illustrating a modification of the detection process for the parking candidate positions by the calculation unit 52. The calculation unit 52 starts the process illustrated in FIG. 15 when a touch operation is performed on the automatic parking button displayed on the touch panel 42.

As illustrated in FIG. 15, in the modification, processes from steps S21 to S30 are processes similar to the processes of steps S11 to S20 of the detection process described in FIG. 7. Therefore, description of steps S21 to S30 will be omitted.

When the registered parking candidate position is displayed in step S30, the parking candidate position detection unit 56 determines whether the movement speed of the vehicle is equal to or greater than the second speed or whether the movement distance of the vehicle 10 at the first speed or less is equal to or greater than a predetermined distance determined in advance (step S31). The second speed is a speed greater than the first speed. The predetermined distance is, for example, 10 m. When the registered parking candidate position cannot be detected in step S29 (No in step S29), the process proceeds to step S31 as it is and the parking candidate position detection unit 56 determines whether the movement speed of the vehicle 10 is equal to or greater than the second speed or whether the movement distance of the vehicle 10 at the first speed or less is equal to or greater than the predetermined distance.

When the movement speed of the vehicle 10 is not equal to or greater than the second speed and the movement distance of the vehicle 10 at the first speed or less is not equal to or greater than the predetermined distance in step S31 (No in step S31), the parking candidate position detection unit 56 returns to step S29 to perform each process. When the movement speed of the vehicle 10 is equal to or greater than the second speed or the movement distance of the vehicle 10 at the first speed or less is equal to or greater than the predetermined distance in step S31 (Yes in step S31), the parking candidate position detection unit 56 stops the memory detection for the parking candidate position, that is, the registered candidate detection process (step S32).

Subsequently, based on the stopping of the memory detection in step S32, the parking candidate position detection unit 56 starts (resumes) the detection of the space/white-line in the parking lot, that is, the unregistered candidate detection process (step S33).

Subsequently, the parking candidate position detection unit 56 determines whether the space/white-line can be detected in the detection process of step S33, that is, whether the unregistered parking candidate position can be detected (step S34).

When the unregistered parking candidate position can be detected in step S34 (Yes in step S34), the reception unit 57 displays the detected unregistered parking candidate position on the touch panel 42 (step S35).

Subsequently, the parking candidate position detection unit 56 determines whether the movement speed of the vehicle 10 is zero, that is, whether the vehicle 10 stopped (step S36). Conversely, when the unregistered parking candidate position cannot be detected in step S34 (No in step S34), the process proceeds to step S36 as it is and the parking candidate position detection unit 56 determines whether the movement speed of the vehicle 10 is zero.

When the movement speed of the vehicle 10 is not zero in step S36 (No in step S36), the parking candidate position detection unit 56 returns to step S34 to perform each process. When the movement speed of the vehicle 10 is zero in step S36 (Yes in step S36), the parking candidate position detection unit 56 stops the detection of the space/white-line in the parking lot, that is, the unregistered candidate detection process (step S37).

The processes from steps S38 to S41 are similar to the processes from steps S18 to S21 described in FIG. 7. Therefore, description of steps S18 to S21 will be omitted.

<Switching between Memory Detection and Space/White-Line Detection>

Figure 17:
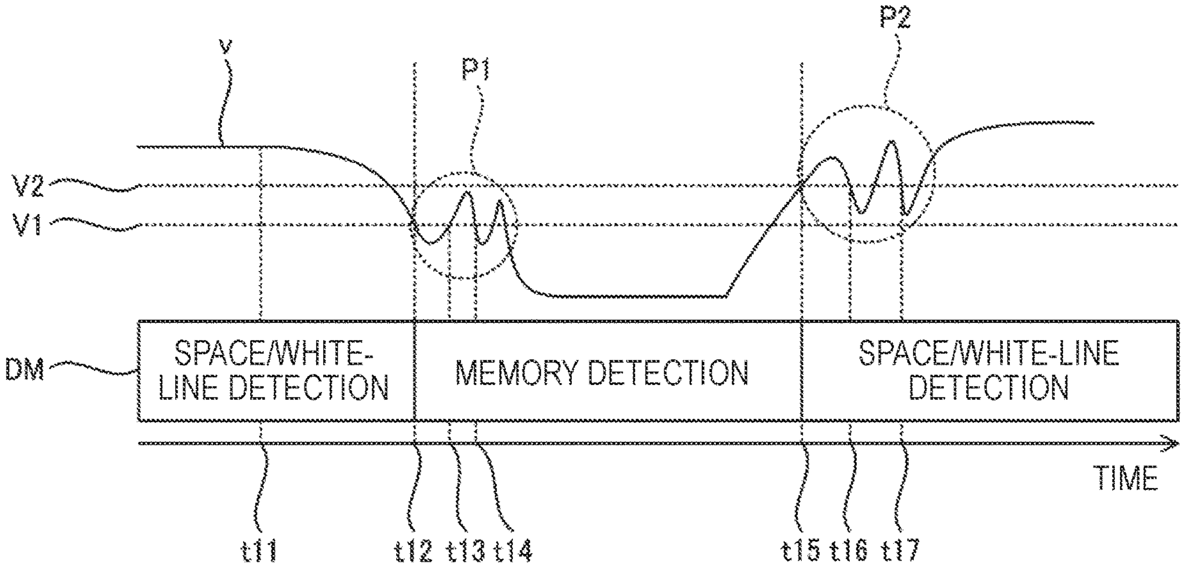
FIG. 17 is a diagram illustrating a relationship between a change in a movement speed of a vehicle and a change in a detection mode of parking candidate positions according to a modification.

Next, switching between the memory detection of the parking candidate position (the registered candidate detection process) and the space/white-line detection (the unregistered candidate detection process) according to a modification of the above-described detection process for the parking candidate position will be described with reference to FIGS. 17 and 18. FIG. 17 is a diagram illustrating a relationship between a change in the movement speed v of the vehicle 10 and a change in the detection mode DM of the parking candidate position according to a modification of the detection process for the parking candidate position.

It is assumed that, after the vehicle 10 starts moving to detect the parking candidate position, the movement speed is change to, for example, the movement speed v illustrated in FIG. 17. When the movement speed v of the vehicle 10 is faster than the first speed V1, for example, at time t11, the parking candidate position detection unit 56 sets the detection mode DM of the parking candidate position to the mode of the space/white-line detection and performs the unregistered candidate detection process.

When the movement speed v of the vehicle 10 is slowed down and becomes equal to or less than the first speed V1, for example, like at time t12, the parking candidate position detection unit 56 stops the mode of the space/white-line detection for the parking candidate position and starts the mode of the memory detection (the registered candidate detection process).

It is assumed that, after the movement speed v of the vehicle 10 becomes equal to or less than the first speed V1 at time t12, for example, the movement speed v is repeatedly changed in a short time such as a period P1 surrounded by a dotted line. Here, even when the changed movement speed v exceeds the first speed V1, for example, like at time t13 and time t14, the parking candidate position detection unit 56 maintains the detection mode DM of the parking candidate position to the mode of the memory detection and does not change the mode to the mode of the space/white-line detection. For example, when the movement speed v of the vehicle 10 becomes equal to or greater than, for example, the second speed V2 greater than the first speed V1 like at time t15 in FIG. 17, the parking candidate position detection unit 56 stops the mode of the memory detection for the parking candidate position and starts the mode of the space/white-line detection (the unregistered candidate detection process).

Similarly, it is assumed that, after the movement speed v of the vehicle 10 becomes equal to or greater than the second speed V2 at time t15, for example, the movement speed v is repeatedly changed in a short time such as a period P2 surrounded by a dotted line. Here, even when the changed movement speed v falls below the second speed V2, for example, like at time t16 and time t17, the parking candidate position detection unit 56 maintains the detection mode DM of the parking candidate position to the mode of the space/white-line detection and does not change the mode to the mode of the memory detection.

Figure 18:
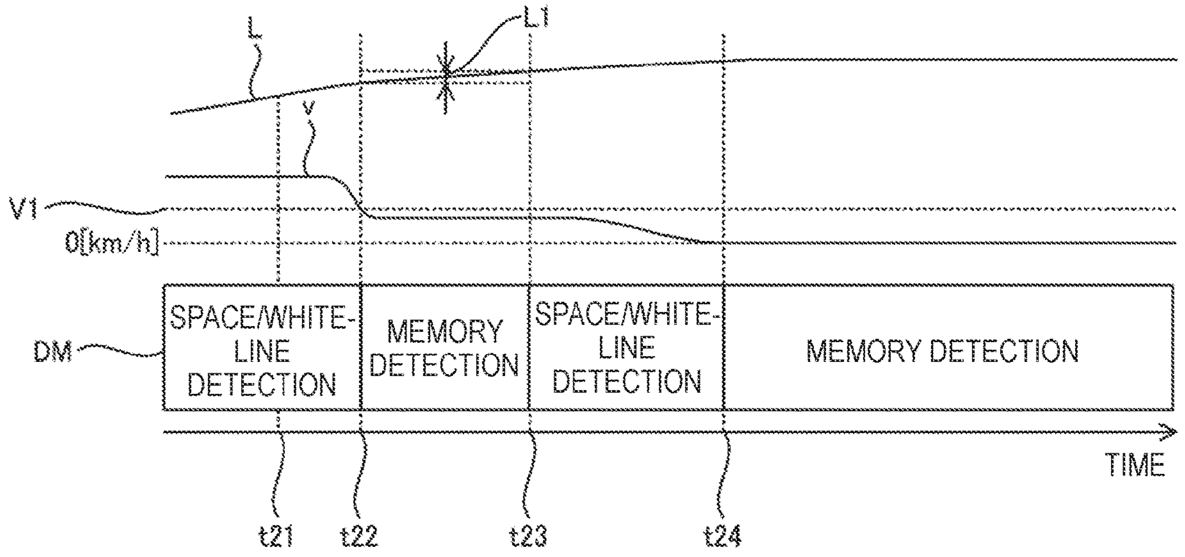
FIG. 18 is a diagram illustrating a relationship between a change in a movement distance of a vehicle, a change in a movement speed, and a change in a detection mode of parking candidate positions according to a modification.

FIG. 18 is a diagram illustrating a relationship between a change in a movement distance L of the vehicle 10, a change in the movement speed v, and a change in the detection mode DM of the parking candidate position according to a modification of the detection process for the parking candidate position.

It is assumed that, after the vehicle 10 starts moving to detect a parking candidate position, the movement speed is changed to, for example, the movement speed v illustrated in FIG. 18, and the movement distance of the moving vehicle 10 is changed to, for example, the movement distance L illustrated in FIG. 18. When the movement speed v of the vehicle 10 is faster than the first speed V1, for example, at time t21, the parking candidate position detection unit 56 sets the detection mode DM of the parking candidate position to the mode of the space/white-line detection and performs the unregistered candidate detection process.

When the movement speed v of the vehicle 10 is slowed down and becomes equal to or less than the first speed V1, for example, at time t22, the parking candidate position detection unit 56 stops the mode of the space/white-line detection for the parking candidate position and starts the mode of the memory detection (the registered candidate detection process).

It is assumed that, after the movement speed v of the vehicle 10 becomes equal to or less than the first speed V1 at time t22, the mode of the memory detection (the registered candidate detection process) continues at the movement speed v equal to or less than the first speed V1. Here, when the movement distance L of the vehicle 10 in the mode of the memory detection is equal to or greater than, for example, a predetermined distance L1 at time t23 of FIG. 18, the parking candidate position detection unit 56 stops the mode of the memory detection for the parking candidate position and starts the mode of the space/white-line detection (the unregistered candidate detection process). That is, even when the movement speed v of the vehicle 10 does not exceed the first speed V1, when the movement distance L of the vehicle 10 becomes equal to or greater than the predetermined distance L1, the parking candidate position detection unit 56 stops the mode of the memory detection for the parking candidate position and starts the mode of the space/white-line detection.

After the mode of the space/white-line detection (the unregistered candidate detection process) starts and then the movement speed v of the vehicle 10 becomes zero (the vehicle 10 stops), for example, like at time t24 of FIG. 18, the parking candidate position detection unit 56 stops the mode of the space/white-line detection for the parking candidate position and starts the mode of the memory detection (the registered candidate detection process).

As such, the parking candidate position detection unit 56 of the calculation unit 52 according to the modification stops the unregistered candidate detection process when detecting that the movement speed v of the vehicle 10 during movement of the vehicle 10 becomes equal to or less than the first speed V1, starts the registered candidate detection process, then stops the registered candidate detection process when detecting that the movement speed of the vehicle 10 becomes equal to or greater than the second speed V2 greater than the first speed V1, and resumes the unregistered candidate detection process based on the stopping of the registered candidate detection process. In such configuration, the unregistered candidate detection process can be resumed based on the movement speed v of the vehicle 10 during the registered candidate detection process. Therefore, when the registered parking candidate position is not detected, the unregistered parking candidate position can also be found again, and thus usability is further improved. By setting the second speed V2 to be greater than the first speed V1, it is possible to prevent the registered candidate detection process from being stopped by a small change in the movement speed of the vehicle 10.

The parking candidate position detection unit 56 stops the unregistered candidate detection process when detecting that the movement speed v of the vehicle 10 during movement of the vehicle 10 becomes equal to or less than the first speed V1, starts the registered candidate detection process, then stops the registered candidate detection process when detecting that the movement distance L of the vehicle 10 becomes equal to or greater than the predetermined distance L1, and resumes the unregistered candidate detection process based on the stopping of the registered candidate detection process. In such configuration, when the movement distance L of the vehicle 10 is lengthened during the registered candidate detection process, the unregistered candidate detection process can be resumed. Therefore, for example, even when the movement speed v of the vehicle 10 is not changed, the unregistered candidate detection process can be resumed based on the movement distance L, and thus usability is further improved.

After the registered candidate detection process is stopped and the unregistered candidate detection process is resumed, the parking candidate position detection unit 56 stops the unregistered candidate detection process based on the stopping of the vehicle 10 and resumes the registered candidate detection process based on the stopping of the unregistered candidate detection process. In such configuration, the registered candidate detection process has already been executed when detecting that the movement speed v of the vehicle 10 becomes equal to or less than the first speed V1. Therefore, after the unregistered candidate detection process is resumed, usability is guaranteed even when the movement speed v is not raised to the first speed V1 to stop the unregistered candidate detection process and resume the registered candidate detection process.

The embodiment of the present invention has been described above, but the present invention is not limited to the foregoing embodiment and modifications, improvements, or the like can be made as appropriate.

For example, in the foregoing embodiment, the case where the vehicle 10 is automatically parked by automatic steering of the parking control unit 58 has been described, but the present invention is not limited thereto. For example, the present invention may be applied to parking support in which assistance is performed when the vehicle 10 is parked by an operation of a driver.

In the foregoing embodiment, the case where the control ECU 20 displays the bird's-eye view image 60 or the like on the touch panel 42 of the vehicle 10 has been described, but the present invention is not limited thereto. For example, the control ECU 20 may display the bird's-eye view image 60 or the like on a display screen of an information terminal (for example, a smartphone or the like) carried by a passenger of the vehicle 10 via the communication unit 24.

In the foregoing embodiment, the case where information such as a map including feature points of the designated parking position is registered in the storage unit 54 of the vehicle 10 has been described, but the present invention is not limited thereto. For example, such information may be registered in a storage unit of another device such as an information terminal or a server communicably connected to the vehicle 10.

In the foregoing embodiment, the example in which the moving body is a vehicle (a four-wheeled automobile) has been described, but the present invention is not limited thereto. For example, the moving body may be a vehicle such as a two-wheeled vehicle or a segway. The idea of the present invention is not limited to a vehicle and can be applied to a robot, a ship, an airplane, or the like which includes a driving source and can be moved by power of the driving source.

The control method described in the above-described embodiment can be implemented by causing a computer to execute a control program prepared in advance. The control program is recorded on a computer-readable storage medium and is executed by being read from the storage medium. The control program may be provided in a form in which the control program is stored in a non-transitory storage medium such as a flash memory, or may be provided via a network such as the Internet. A computer that executes the control program may be included in the control device, may be included in an electronic device such as a smartphone, a tablet terminal, or a personal computer capable of communicating with the control device, or may be included in a server device capable of communicating with the control device and the electronic device.

In the present specification, at least the following factors are described. Constituents in parentheses indicate corresponding constituents in the foregoing embodiment, but the present invention is not limited thereto.

(1) A control device (the calculation unit 52) for a moving body (the vehicle 10), the control device including:

an outside recognition unit (the outside recognition unit 55) configured to acquire recognition data which is data of an outside of the moving body;

a parking candidate position detection unit (the parking candidate position detection unit 56) configured to detect parking candidate positions of the moving body based on the recognition data; and a reception unit (the reception unit 57) configured to receive a selection of a parking position of the moving body from a user of the moving body among the parking candidate positions, in which the parking candidate position detection unit is configured to:

be able to execute a first detection process of detecting an unregistered parking candidate position and a second detection process of detecting a registered parking candidate position;

start the first detection process based on an operation by the user;

stop the first detection process when detecting that a movement speed of the moving body during movement of the moving body becomes equal to or less than a predetermined speed; and start the second detection process based on stopping of the first detection process.

According to (1), since the movement speed at which the second detection process of detecting the registered parking candidate position is started can be raised (the second detection process is started during movement of the moving body), the second detection process can be started at an earlier stage when the vehicle is stopped. Therefore, it is possible to shorten time until the second detection process is completed and a result of the second detection process is notified, and thus usability is improved.

(2) The control device according to (1), in which the parking candidate position detection unit is configured to:

stop the second detection process when detecting at least one of a case where the movement speed becomes equal to or greater than the predetermined speed or a case where a movement distance of the moving body becomes equal to or greater than a predetermined distance after the start of the second detection process; and resume the first detection process based on stopping of the second detection process.

According to (2), since the first detection process can be resumed based on a movement speed or a movement distance of the moving body during the second detection process, usability is improved.

(3) The control device according to (2), in which the parking candidate position detection unit is configured to:

stop the first detection process when detecting that the movement speed of the moving body during the movement of the moving body becomes equal to or less than a first speed; and stop the second detection process when detecting that the movement speed becomes equal to or greater than a second speed greater than the first speed after starting of the second detection process.

According to (3), by setting the second speed to be greater than the first speed, it is possible to prevent the second detection process from being stopped by a small change in the movement speed.

(4) The control device according to (2) or (3), in which the parking candidate position detection unit is configured to:

stop the first detection process when detecting that the moving body stops after resuming of the first detection process; and resume the second detection process based on stopping of the first detection process.

According to (4), the second detection process has been already executed when detecting that the movement speed becomes equal to or less than the predetermined speed. Therefore, after the first detection process is resumed, usability is guaranteed even when the movement speed is not raised to stop the first detection process and resume the second detection process.

(5) The control device according to any one of (1) to (4), in which the reception unit is configured to:

display the unregistered parking candidate position and receive the selection of the parking position from the user when the unregistered parking candidate position is detected based on the first detection process; and display the registered parking candidate position and receive the selection of the parking position from the user when the registered parking candidate position is detected based on the second detection process.

According to (5), since the detected parking candidate position is displayed, it is easy for a user to select a parking position.

(6) The control device according to (5), in which the reception unit is configured to display the unregistered parking candidate position and the registered parking candidate position in different modes when the unregistered parking candidate position is detected based on the first detection process and the registered parking candidate position is detected based on the second detection process.

According to (6), the user can easily distinguish the displayed unregistered parking candidate position and registered parking candidate position from each other.

(7) The control device according to any one of (1) to (6), further including a parking control unit (the parking control unit 58) configured to perform parking control to park the moving body at the parking position selected by the user.

According to (7), the moving body can be parked at the parking position selected by the user.

(8) The control device according to any one of (1) to (7), in which:

the first detection process is a process of detecting the unregistered parking candidate position based on at least one of detection of a parking range and detection of an empty parking space; and the second detection process is a process of detecting the registered parking candidate position based on comparison between a feature point of the recognition data when the user registered the registered parking candidate position in the past and a feature point of the recognition data at present.

According to (8), it is possible to accurately detect each of the unregistered parking candidate position and the registered parking candidate position.

(9) A control method by a control device for a moving body, the control device including an outside recognition unit configured to acquire recognition data which is data of an outside of the moving body, a parking candidate position detection unit configured to detect parking candidate positions of the moving body based on the recognition data, and a reception unit configured to receive a selection of a parking position of the moving body from a user of the moving body among the parking candidate positions, in which a processor of the control device is configured to:

be able to execute a first detection process of detecting an unregistered parking candidate position and a second detection process of detecting a registered parking candidate position;

start the first detection process based on an operation by the user;

stop the first detection process when detecting that a movement speed of the moving body during movement of the moving body becomes equal to or less than a predetermined speed; and start the second detection process based on stopping of the first detection process.

According to (9), since the movement speed at which the second detection process of detecting the registered parking candidate position is started can be raised (the second detection process is started during movement of the moving body), the second detection process can be started at an earlier stage when the vehicle is stopped. Therefore, it is possible to shorten time until the second detection process is completed and a result of the second detection process is notified, and thus usability is improved.

(10) A control program for a control device for a moving body, the control device including an outside recognition unit configured to acquire recognition data which is data of an outside of the moving body, a parking candidate position detection unit configured to detect parking candidate positions of the moving body based on the recognition data, and a reception unit configured to receive a selection of a parking position of the moving body from a user of the moving body among the parking candidate positions, the control program causing a processor of the control device to execute processes of:

being able to execute a first detection process of detecting an unregistered parking candidate position and a second detection process of detecting a registered parking candidate position;

starting the first detection process based on an operation by the user;

stopping the first detection process when detecting that a movement speed of the moving body during movement of the moving body becomes equal to or less than a predetermined speed; and starting the second detection process based on the stopping of the first detection process.

According to (10), since the movement speed at which the second detection process of detecting the registered parking candidate position is started can be raised (the second detection process is started during movement of the moving body), the second detection process can be started at an earlier stage when the vehicle is stopped. Therefore, it is possible to shorten time until the second detection process is completed and a result of the second detection process is notified, and thus usability is improved.

What is claimed is:

1. A control device for a moving body, the control device comprising:

an outside recognition unit configured to acquire recognition data which is data of an outside of the moving body;

a parking candidate position detection unit configured to detect parking candidate positions of the moving body based on the recognition data;

a reception unit configured to receive a selection of a parking position of the moving body from a user of the moving body among the parking candidate positions; and a registration unit configured to register a parking position as a registered parking candidate position, wherein the parking candidate position detection unit is configured to:

be able to execute a first detection process of detecting, based on the recognition data acquired by the outside recognition unit, an unregistered parking candidate position and a second detection process of detecting the registered parking candidate position registered by the registration unit;

start the first detection process based on an operation by the user;

stop the first detection process when detecting that a movement speed of the moving body during movement of the moving body becomes equal to or less than a predetermined speed; and start the second detection process based on stopping of the first detection process, wherein the registered parking candidate position is a parking position that has been detected by the first detection process performed previously and a parking position registered by the user previously.

2. The control device according to claim 1, wherein the parking candidate position detection unit is configured to:

stop the second detection process when detecting at least one of a case where the movement speed becomes equal to or greater than the predetermined speed or a case where a movement distance of the moving body becomes equal to or greater than a predetermined distance after the start of the second detection process; and resume the first detection process based on stopping of the second detection process.

3. The control device according to claim 2, wherein the parking candidate position detection unit is configured to:

stop the first detection process when detecting that the movement speed of the moving body during the movement of the moving body becomes equal to or less than a first speed; and stop the second detection process when detecting that the movement speed becomes equal to or greater than a second speed greater than the first speed after starting of the second detection process.

4. The control device according to claim 2, wherein the parking candidate position detection unit is configured to:

stop the first detection process based on stopping of the moving body after resuming of the first detection process; and resume the second detection process based on stopping of the first detection process.

5. The control device according to claim 1, wherein the reception unit is configured to:

display the unregistered parking candidate position and receive the selection of the parking position from the user when the unregistered parking candidate position is detected based on the first detection process; and display the registered parking candidate position and receive the selection of the parking position from the user when the registered parking candidate position is detected based on the second detection process.

6. The control device according to claim 5, wherein the reception unit is configured to display the unregistered parking candidate position and the registered parking candidate position in different modes when the unregistered parking candidate position is detected based on the first detection process and the registered parking candidate position is detected based on the second detection process.

7. The control device according to claim 1, further comprising a parking control unit configured to perform parking control to park the moving body at the parking position selected by the user.

8. The control device according to claim 1, wherein:

the first detection process is a process of detecting the unregistered parking candidate position based on at least one of detection of a parking range and detection of an empty parking space; and the second detection process is a process of detecting the registered parking candidate position based on comparison between a feature point of the recognition data when the user registered the registered parking candidate position in the past and a feature point of the recognition data at present.

9. A control method by a control device for a moving body, the control device including an outside recognition unit configured to acquire recognition data which is data of an outside of the moving body, a parking candidate position detection unit configured to detect parking candidate positions of the moving body based on the recognition data, a reception unit configured to receive a selection of a parking position of the moving body from a user of the moving body among the parking candidate positions, and a registration unit configured to register a parking position as a registered parking candidate position, wherein a processor of the control device is configured to:

be able to execute a first detection process of detecting, based on the recognition data acquired by the outside recognition unit, an unregistered parking candidate position and a second detection process of detecting the registered parking candidate position registered by the registration unit;

start the first detection process based on an operation by the user;

stop the first detection process when detecting that a movement speed of the moving body during movement of the moving body becomes equal to or less than a predetermined speed; and start the second detection process based on stopping of the first detection process, wherein the registered parking candidate position is a parking position that has been detected by the first detection process performed previously and a parking position registered by the user previously.

10. A non-transitory computer-readable storage medium storing a control program for a control device for a moving body, the control device including an outside recognition unit configured to acquire recognition data which is data of an outside of the moving body, a parking candidate position detection unit configured to detect parking candidate positions of the moving body based on the recognition data, a reception unit configured to receive a selection of a parking position of the moving body from a user of the moving body among the parking candidate positions, and a registration unit configured to register a parking position as a registered parking candidate position, the control program causing a processor of the control device to execute processes of:

being able to execute a first detection process of detecting, based on the recognition data acquired by the outside recognition unit, an unregistered parking candidate position and a second detection process of detecting the registered parking candidate position registered by the registration unit;

starting the first detection process based on an operation by the user;

stopping the first detection process when detecting that a movement speed of the moving body during movement of the moving body becomes equal to or less than a predetermined speed; and starting the second detection process based on the stopping of the first detection process, wherein the registered parking candidate position is a parking position that has been detected by the first detection process performed previously and a parking position registered by the user previously.

* * * * *